(12) United States Patent
Ichikawa et al.

(10) Patent No.: US 7,655,195 B1
(45) Date of Patent: Feb. 2, 2010

(54) UNDULATED-WALL HONEYCOMB STRUCTURE AND MANUFACTURING METHOD THEREOF

(75) Inventors: Yukihito Ichikawa, Nagoya (JP); Toshihiko Hijikata, Nagoya (JP); Makoto Miyazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 704 days.

(21) Appl. No.: 09/830,030

(22) PCT Filed: Aug. 30, 2000

(86) PCT No.: PCT/JP00/05862

§ 371 (c)(1),
(2), (4) Date: Apr. 20, 2001

(87) PCT Pub. No.: WO01/15877

PCT Pub. Date: Mar. 8, 2001

(30) Foreign Application Priority Data

Aug. 30, 1999 (JP) .................................. 11-242679

(51) Int. Cl.
*F01N 3/022* (2006.01)
*F01N 3/00* (2006.01)
*B32B 3/12* (2006.01)
*H01M 8/00* (2006.01)

(52) U.S. Cl. .......................... 422/180; 422/222; 55/523; 55/DIG. 30; 428/73; 428/116; 429/12

(58) Field of Classification Search ................. 422/177, 422/180, 222; 428/116, 593, 594; 502/439, 502/527.19, 527.18, 527.2, 527.21, 527.22
See application file for complete search history.

(56) References Cited

U.S. PATENT DOCUMENTS 3,903,341 A * 9/1975 Gerhold ...................... 428/116

(Continued)

FOREIGN PATENT DOCUMENTS

EP 0 389 750 10/1990

(Continued)

OTHER PUBLICATIONS

JPO Machine Translation for Hamada (JP 05-123580).*

*Primary Examiner*—Jennifer A Leung
(74) *Attorney, Agent, or Firm*—Burr & Brown

(57) ABSTRACT

An undulated-wall honeycomb structure (1) has multiple cell passages (2) with mutually parallel passage directions. With this undulated-wall honeycomb structure (1), intersections (4) between walls (3) partitioning the cell passages (2) are formed at cross-sections perpendicular to the cell passages (2) and positioned systematically maintaining a predetermined pitch, and also the wall face portions (5) of the walls (3) excluding the intersections (4) are formed with undulated shapes in both the cell passage direction and the cross-section direction perpendicular to the cell passage direction. According to this undulated-wall honeycomb structure, advantages such as improved exhaust gas purification capabilities and catalyst capabilities, improved mechanical strength for canning, and further improved heat-resistant shock properties can be obtained.

28 Claims, 19 Drawing Sheets

U.S. PATENT DOCUMENTS

| | | | | |
|---|---|---|---|---|
| 4,276,071 | A | * | 6/1981 | Outland .................. 55/523 |
| 4,318,888 | A | | 3/1982 | Chapman et al. ............. 422/180 |
| 4,323,614 | A | | 4/1982 | Gulati ..................... 422/180 |
| 4,448,828 | A | * | 5/1984 | Mochida et al. ............ 428/34.4 |
| 4,845,073 | A | | 7/1989 | Cyron ..................... 502/439 |
| 4,928,485 | A | | 5/1990 | Whittenberger ............. 422/180 |
| 4,979,364 | A | | 12/1990 | Fleck ...................... 60/274 |
| 4,992,233 | A | | 2/1991 | Swaroop et al. ................ 419/2 |
| 5,316,577 | A | | 5/1994 | Wu ....................... 106/189.1 |
| 5,459,119 | A | * | 10/1995 | Abe et al. ................. 502/326 |
| 5,460,865 | A | | 10/1995 | Tsotsis .................... 428/116 |
| 5,853,902 | A | | 12/1998 | Usui ...................... 428/593 |
| 6,274,099 | B1 | * | 8/2001 | Maus et al. ................ 422/180 |

FOREIGN PATENT DOCUMENTS

| | | | |
|---|---|---|---|
| EP | 0 886 040 | | 12/1998 |
| GB | 2071640 | * | 9/1981 |
| JP | 52-119611 | | 10/1977 |
| JP | 58-043238 | | 3/1983 |
| JP | 61-68141 | | 4/1986 |
| JP | 1-73336 | | 5/1989 |
| JP | 1-218826 | | 9/1989 |
| JP | 2-127402 | | 10/1990 |
| JP | 3-151049 | | 6/1991 |
| JP | 5-123580 | | 5/1993 |
| JP | 7-265652 | | 10/1995 |
| JP | 8-283002 | | 10/1996 |
| JP | 9-151722 | | 6/1997 |
| JP | 9-201537 | | 8/1997 |
| JP | 9-222009 | | 8/1997 |
| JP | 10-59784 | | 3/1998 |
| WO | WO 96/12876 | * | 5/1996 |
| WO | WO 97/45200 | | 12/1997 |

* cited by examiner

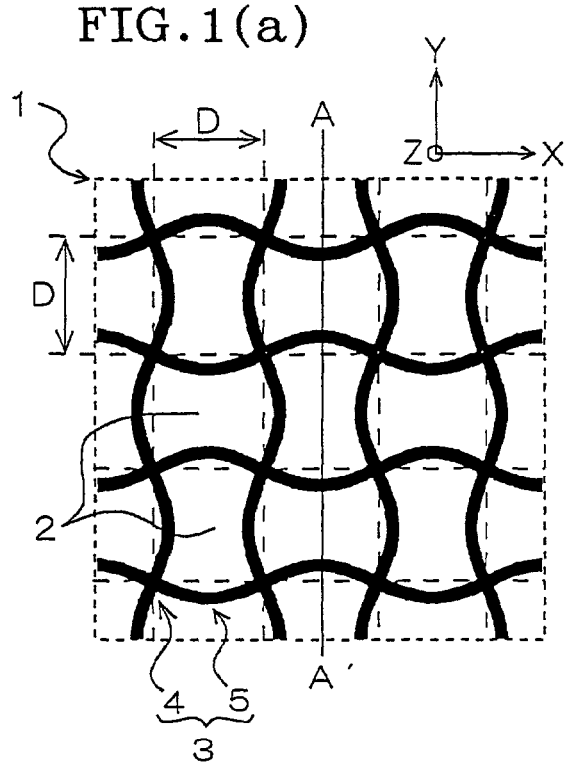
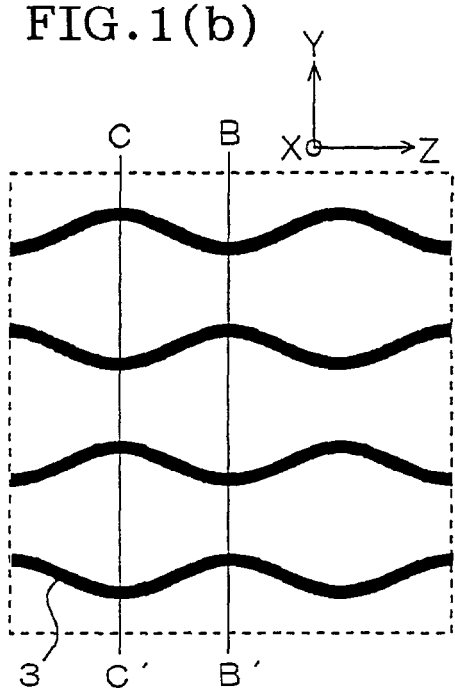
FIG.1(a)
FIG.1(b)
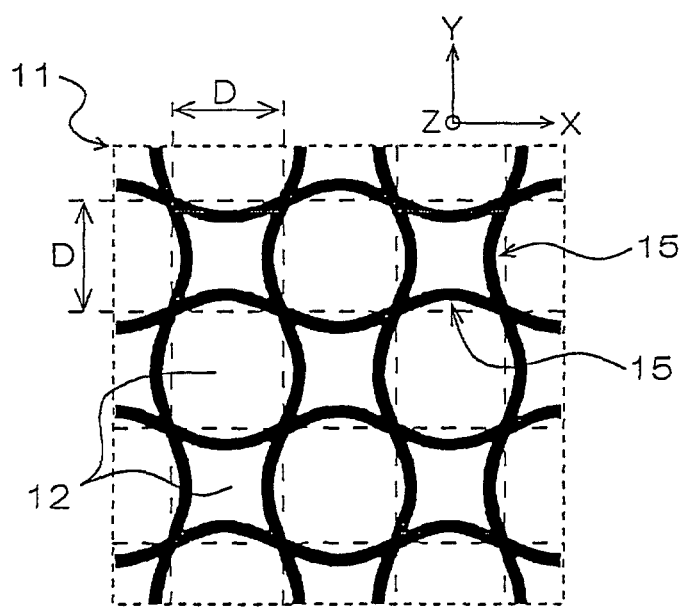
FIG.2

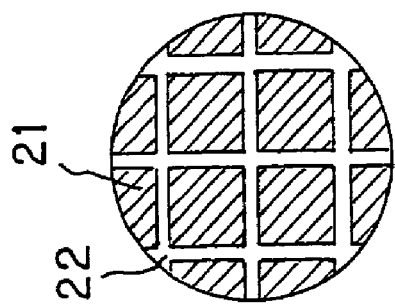
FIG.15(d)
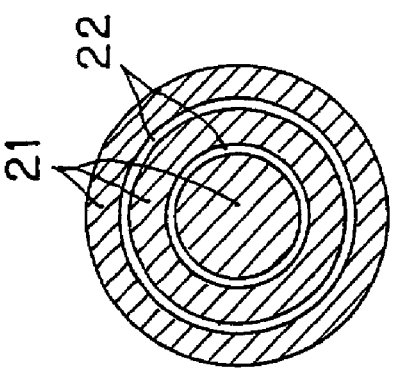
FIG.15(c)
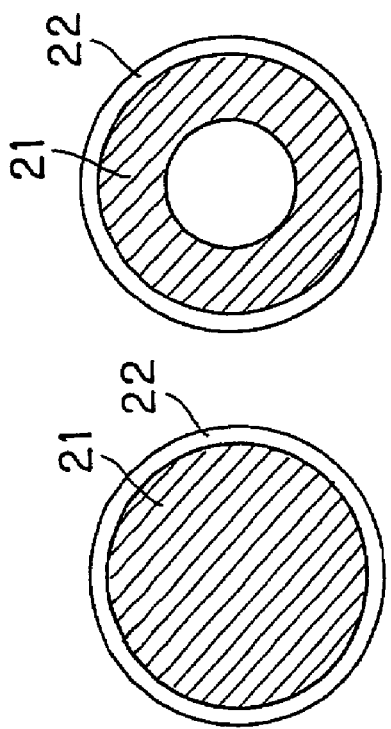
FIG.15(b)
FIG.15(a)
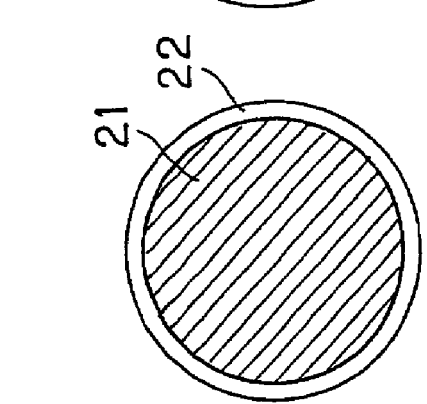
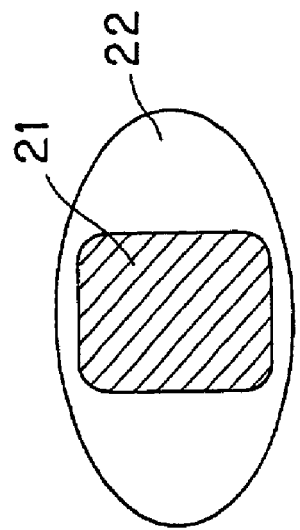
FIG.15(e)

UNDULATED-WALL HONEYCOMB STRUCTURE AND MANUFACTURING METHOD THEREOF

TECHNICAL FIELD

The present invention relates to an undulated-wall honeycomb structure used as an internal combustion engine exhaust gas purification catalyst carrier or deodorizing catalyst carrier for vehicle exhaust gas and the like, as a filter for various types of filtering devices, as a heat exchanger unit, or as a chemical reactor carrier such as a modifying catalyst carrier for fuel cells or the like.

BACKGROUND ART

Honeycomb structures are widely used as internal combustion engine exhaust gas purification catalyst carriers or deodorizing catalyst carriers for vehicle exhaust gas and the like. Conventionally, with such honeycomb structures, in the case of using as a vehicle exhaust gas purification catalyst carrier for example, the walls partitioning the cell passages have conventionally been generally formed in flat shapes to reduce pressure loss.

However, in recent years, in accordance with stricter emission standards based on environmental issues, purification capabilities of exhaust gas purification catalysts for vehicles have come to be viewed as being more important than pressure loss properties. Accordingly, development of engines to reduce the amount of emission of harmful substances such as hydrocarbons (HC), carbon monoxide (CO), oxides of nitrogen (NOx), and so forth, and improvement of three way catalysts have progressed, and emission of harmful substances is on a decline due to the effects of both of these.

Thus, while the overall emissions during operation of the engine are decreasing, the amount of emission of harmful substances immediately after starting the engine is being examined more closely. With the FTP-75 cycle which is the restriction driving cycle in the USA, for example, 60% to 80% of the total amount of exhaust is discharged within the Cold-Transient mode which is the first 140 seconds after starting the engine.

One cause is that, immediately following starting the engine in particular, the exhaust gas temperature is low and the catalyst is not activated sufficiently, so the harmful substances pass through the catalyst without being purified. Also, another factor is that the fuel combustion state is not stable in engines immediately after starting, and the A/F (air/fuel ratio) of the exhaust gas, i.e., the ratio of oxygen in the exhaust gas, which is an important factor that affects the purification capabilities of the three way catalyst, changes.

Accordingly, various attempts are being made to speedily raise the temperature of the catalyst immediately after starting the engine, such as placing the catalyst where the temperature of the exhaust gas is high by positioning the catalyst as close to the engine as possible, making the cell partitions thin to lower the thermal capacity of the catalyst carrier itself, increasing the cell concentration of the carrying member in order to increase the amount of area of contact between the catalyst and exhaust gas while speedily absorbing the heat of the exhaust gas, and so forth.

However, with conventional normal honeycomb structures, the walls are almost always formed with a flat shape so that the cell passages are straight tubes, in order to reduce pressure loss. Accordingly, measures are taken to increase the contact area between the walls and the exhaust gas by making the walls thinner and increasing the number of cells, but improvement of purification capabilities has been limited, such as there being limitations to the increase in contact area, sufficient purification effects for harmful substances in the exhaust gas has not been observed, and so forth.

Further, in the event that the amount of catalyst being carried is increased to improve the purification capabilities, not only are great amounts of platinums which are the catalyst component used, which leads to increased costs, but also the catalyst layer becomes thicker, which means that the percentage of catalyst which can actually come into sufficient contact with the exhaust gas decreases, so the increase in purification capabilities hoped for cannot be obtained. Also, while the initial capabilities of the catalyst are high, there is an even higher concentration of precious metals, and the catalysts tend to coagulate one with another over time, leading to the problem of short usage life span.

Accordingly, JP-A-58-43238 discloses a ceramic honeycomb structure wherein the cell passages have been made in a meandering form from the entrance to the exit, so as to increase interaction between the cell passage walls and the fluid flowing therethrough and thus improve purification capabilities by increasing the surface area within the cell passages, and a method for manufacturing a honeycomb structure wherein the cell passages have been made in a meandering form in the cell passage direction (referring to the passage direction of the cell passages) by causing extrusion molding members to perform rotational vibration within the cell passage cross-sections.

However, with the honeycomb structure disclosed in JP-A-58-43238, the walls partitioning the cell passages one from another have a curved form, but no protrusions or recessions have been provided to the surface of the walls. Accordingly, the increase in the surface area within the cell passage is limited to the length of the cell passage lengthened by making the cell passage to meander, so marked improves in catalyst capabilities are not expected.

Also, JP-A-3-151049 discloses a ceramic honeycomb structure wherein the walls of the periphery portion of the honeycomb structure are flat, and only the walls at the center portion are raised and lowered, thereby increasing the interaction between the exhaust gas and the walls so as to increase purification effectiveness, and also forming the periphery portion walls thicker so as to increase the strength against external pressure and the holding strength.

However, with the honeycomb structure disclosed in this JP-A-3-151049, while the cell passages themselves are raised and lowered in the cell passage direction, the walls are not formed so as to be raised and lowered in the cross-sectional direction of the cell passages. Accordingly, as with the case of the honeycomb structure disclosed in JP-A-58-43238, the increase in surface area within the cell passage is restricted to the length by which the cell passage length has been increased by forming protrusions and recessions in the cell passage direction, so marked increase in catalyst capabilities are not expected.

Further, JP-A-5-123580 discloses a honeycomb structure wherein the walls at the center portion are formed in an undulated shape in both directions of the cell passage direction and the cross-sectional direction perpendicular to the passage direction, and also wherein the recessions and protrusions of the undulated wall are synchronized so as to face in the same direction in the direction of the cell passage.

With the honeycomb structure according to JP-A-5-123580, in addition to increased surface area by essential extending of the cell passage length as with JP-A-58-43238 and JP-A-3-151049, the walls are undulated in the direction perpendicular to the cell passage direction as well, thereby increasing surface area.

However, the recessions and protrusions thereof are synchronized in the direction of the cell passage, so the shape of the cross-section at arbitrary positions along the cell passage is the same. Accordingly, the flow of a fluid within the cell passage readily becomes a stationary flow, and consequently there is a problem that it becomes difficult to aggressively increase the interaction between the fluid flowing through the cell passages and the wall faces.

Also, JP-A-52-119611 discloses deforming walls for the purpose of adjusting thermal stress or deformation due to mechanical stress on the plane perpendicular to the longitudinal direction of the cells (passage direction), but due to the same problem as with that in JP-A-5-123580, does not contribute to improved catalyst capabilities. Also, the description in JP-A-52-119611 that the amplitude of the wall deformation (sine wave) deformations is smaller than the wall thickness reduces stress focusing on the deformed portions of the walls, but does not agree with the aggressive increase of interaction between exhaust gas and the walls, with is the essence of the present invention.

Further, with metal honeycomb structures wherein the cell formations of stainless heat-resistant steel are undulated forms, structures are being proposed wherein a great number of small round indentations are formed in the cell passage direction with a certain spacing therebetween, in the direction orthogonal to the cell passage direction. However, with this structure, great turbulence effects cannot be expected, and also even in the event that catalyst is carried, the grooves are small, so the catalyst layer fills in the grooves, thereby reducing the effects of forming the grooves. There are hardly any pores in the case of metal, so coating with a catalyst layer of γ alumina results in a coat with frequent collecting in corner portions like grooves.

Now, honeycomb structures which are small, light, and use less amount of catalyst while manifesting excellent properties of transfer effectiveness and so forth are also being desired, in addition to objects other than the above-described exhaust gas purification, such as for honeycomb structures used as chemical reaction catalyst carriers for gas modifying or the like wherein pressure loss is not a great impedance in usage.

The present invention has been made in light of the above-described problems of the conventional art, and it is an object thereof: to provide a honeycomb structure wherein the surface area of the walls is increased while making the flow of fluid within the cell passages complex so as to increase the interaction between the fluid and walls, which further has mechanical strength and excellent heat and shock resisting properties sufficient to allow placement near an engine to serve for purifying exhaust gasses of engines and the like; and to provide the manufacturing method thereof.

DISCLOSURE OF INVENTION

That is, according to the present invention, an undulated-wall honeycomb structure has a plurality of cell passages which are mutually parallel in channel direction is provided, wherein intersection portions between walls partitioning the cell passages are formed so as to maintain a predetermined pitch at cross-sections perpendicular to the cell passages and positioned systematically, and wherein the wall face portions of the walls excluding the intersection portions are formed so as to have an undulated shape in both the cell passage direction and the cross-sectional direction perpendicular to the cell passage direction.

With this undulated-wall honeycomb structure, regarding each of the cell passages, the wall face portions of an opposing pair of the walls may be each formed so as to have an undulated shape, such that recessions and protrusions on one wall face portion and recessions and protrusions on the other wall face portion are positioned with the protrusions of each facing one another and the recessions of each facing one another, or with the protrusions and the recessions facing one another. Also, the wall face portions formed with an undulated shape and wall face portions formed with a flat shape may be formed in an intermingled fashion.

With the undulated-wall honeycomb structure according to the present invention, regarding each of the cell passages, at least one of the plurality of walls making up the cell passage is preferably formed with an undulated shape, i.e., such that there are no cell passages that do not come into contact with a wall formed with an undulated shape. Also, the degree of undulated deformation whereby the walls are formed with an undulated shape is preferably greater at the outer portion that at the center portion, thereby essentially not allowing passage of exhaust gas through the cell passages at the outer portion. Thus, the advantages of preventing heat discharge from the periphery portion, intensifying the mechanical strength of the periphery portion, and preventing excessive precious metal components from being carried by the periphery portion, as disclosed in JP-A-49-63821 and JP-A-56-129042, can be obtained.

Also, the greater the amplitude and pitch of the undulated deformation of walls are the better, and the degree of the undulated deformation of walls formed with an undulated shape is preferably 150% of the thickness of the walls or more. However, excessive deformation invites increased pressure loss, so the amount of amplitude of deformation is optimized for each cell structure by balancing the degree of improvement in cleaning capabilities and increase of pressure loss, while comparing with engine performance. A relatively small number of cells enables greater undulated deformations, and also allows a greater opening percentage of the honeycomb structure, which is preferably from the perspective of pressure loss. Further, in the event that carbon is generated, as with exhaust gasses from diesel engines, a relatively smaller number of cells are more preferable from the perspective of clogging. As means for reducing pressure loss, only part of the walls may be undulated instead of making all of the walls in an undulated shape. This means is also preferable from the perspective of preventing clogging of the cells.

With the undulated-wall honeycomb structure according to the present invention, various arrangements can be conceived, such as the cell passages being configured of intermingled undulated walls and flat walls, configured of the undulated faces of the undulated walls changing directions, configured such that the size of the undulations of the undulated walls, i.e., the amplitude and pitch thereof, are set variously, and so forth, and there also is a structure wherein the pattern of swells of the undulations of the undulated walls change as described below. For example, with the understanding that undulations are repetitions of recessions and protrusions, a continuous line is formed by the recessions or protrusions of the undulations, and it is also preferably that a line connecting the highest portions of the protrusions and/or the lowest portions of the recessions of the wall face portions formed with an undulated shape in the cell passage direction repeats a pattern of turning in the vertical direction to the cell passage direction on the wall face. Making analogy to mountains for the undulated recessions and protrusions, this is an undulated-wall honeycomb structure wherein the edge line of the mountains or a line connecting the valleys meanders in the cell passage direction. In this case, the repetition of turning may be once per cell passage or once for multiple passages, but such shapes preferably repeat bending once per cell passage, from the perspective of improving cushioning properties. That is to say, the edge line of the mountains meanders even more preferably with small bends.

Also, cell passages formed by the wall face portions of the walls formed in an undulated shape and cell passages formed by the wall face portions of the walls formed in a flat shape may appear and coexist in a discontinuous manner. Making the cell passage to be a state with mixed shapes having differing wall forms rather than having the cell passages uniform, agitates the flow of the fluid to the honeycomb structure so that the contact efficiency between the fluid and walls improves even more.

Further, the undulated-wall honeycomb structure according to the present invention preferably comprises a cell passage area A formed with a generally circular cross-section from the center, and a cell passage area B formed with a generally ring-shaped form at the outer side of the cell passage area A, wherein the cell passage area A contains cell passages formed by the wall face portions of the walls formed having an undulated shape, and wherein the cell passage area B comprises cell passages formed by the wall face portions of the walls formed having a flat shape. An arrangement is even more preferably wherein the thickness of the walls of the cell passages within the cell passage area B is greater than the thickness of the walls of the cell passages within the cell passage area A, and also wherein the thickness thereof increases in stages within the cell passage area B from the inner circumference portion toward the outer portion or only increases in stages near the boundary between area B and area A. Thus, the strength of the honeycomb structure markedly improves.

Suitably used for the material for the undulated-wall honeycomb structure are: ceramic material such as cordierite, alumina, mullite, lithium aluminum silicate, aluminum titanate, titania, zirconia, silicone nitride, aluminum nitride, or silicon carbide; heat-resistant metal materials such as stainless steel; and various adsorbents such as activated charcoal or silica gel or zeolite. One type of ceramic material may be used, of a composite of a plurality thereof may be used.

Undulated-wall honeycomb structures can be obtained according to the configuration of the forming nozzle with other materials as well, as long as the material is capable of extrusion formation, so similar effects as those of the above can be expected with materials wherein particles of differing material or fibers have been dispersed and compounded in the above materials or polymers such as resins, or articles wherein the wall surfaces have been covered following extrusion. In addition, in the case of wrapping metal foil in a corrugated manner to form an undulated-wall honeycomb structure, an undulated-wall honeycomb structure can be obtained by forming undulations in metal foil by plasticity working beforehand.

With these materials, the porosity of the material used is preferably between 45% to 80%, from the perspective of suppressing increase in thermal capacity. In addition, in such cases, the undulated-wall honeycomb structure can be suitably applied to a fine particle removing filter. Plugging one end of particular cell passages of the honeycomb structure and also plugging the other end of the remaining cell passages configures filtering layers of the walls partitioning the cell passages. In the event of using as a fine particle removing filter, the wall thickness of the undulated-wall honeycomb structure is preferably around 0.2 to 1.2 mm, and the cell density of the undulated-wall honeycomb structure is preferably around 50 to 600 cpsi (cells per square centimeter). Providing protrusions and recessions on the surface of the undulated walls of the undulated-wall honeycomb structure allows fine particle removing capabilities to be further improved.

In the event that the surface roughness of the undulated walls is 10% or more in Valley Level which is a standard, the properties of the undulated walls in capturing fine particle substances improves even though the undulated-wall structure with the same, but in the range of less than 10%, no particular change in capturing fine particle substances is observed even if the Valley Level is changed. This improvement is due to the increase in the ratio of area of the fine pores portion of the undulated wall surface. That is to say, forming a great number of fine indentations by micropores on the surface of the undulated wall facilitates capturing of fine particle substances with the fine holes. The captured fine particle substances gradually accumulates, but does not readily separate from the surface of the undulated walls due to the anchoring effects of the fine holes. This is advantageous in that not only does the capturing capabilities of fine particle substances improve, but also the fine particle substances is also sufficiently dealt with by the catalyst component carried on the surface of the walls. Increasing the Valley Level is effective to a certain degree even with normal honeycombs, but there were no effects in particular unless the Valley Level was 20% or more. Using an undulated-wall structure increases the effects at 10% or more. Setting this to 20% or more further improves the capturing properties, so applying the undulated-wall honeycomb structure to a fine particle removing filter enables the fine particle capturing effectiveness to be raised. In the case of a fine particle removing filter of a cordierite honeycomb structure with a wall thickness of 0.30 mm and a cell density of 200 cpsi, increasing the Valley Level from 15% to 30% by raising the porosity resulted in an improvement in capturing effectiveness of less than 5% with normal flat-plane honeycomb structures, but resulted in approximately a 10% improvement with the undulated-wall honeycomb structure.

FIG. 25 is an explanatory diagram illustrating the Valley Level, which represents the degree of wall surface roughness of the honeycomb structure. Here, Valley Level refers to the percentage of the entire area of the walls which the sum of the surface area of the final hole 47 portion on the average face 43 occupies in the event that the partition surface is cut with the average plane 43, wherein the average face 43 is a surface wherein the volume of protrusions and recessions on the surface have been found to be the same by analyzing wall surface roughness data measured two-dimensionally with a surface roughness meter. The diagram also shows benchmark 42, pour surface area at an average plane 44, and a conventional pour surface area 46.

The undulated-wall honeycomb structure according to the present invention is also suitably used as a catalyst carrier, and is used as, for example, an exhaust gas purification catalyst carrier for vehicles, carrying catalyst on the surface on the cell wall face and in micropores within the walls of the honeycomb structure. In this case, the wall thickness is preferably around 0.01 to 0.12 mm, and the cell density is preferably around 200 to 3000 cpsi (cells per square inch).

The method for manufacturing the exhaust gas purification catalyst carrier for vehicles may either be a method wherein catalyst components are carried on the walls of the honeycomb structure so as to obtain a catalytic member, a method wherein the honeycomb structure itself is formed of a catalyst component, or a method combining both.

Generally, hybrid catalysts wherein γ alumina which has a high surface area is coated onto the wall surface of a cordierite honeycomb structure and the alumina layer is made to carry precious metal components as an exhaust gas purification catalyst for vehicles, and solid catalysts wherein a honeycomb structure is formed of titanium dioxide as an exhaust gas purification catalyst for stationary emission sources, are in actual use.

The catalyst components are formed of a combination of precious metals such as platinum, palladium, rhodium and the like, and vanadium oxides, ceria, yttria, zirconia, titania, alkali metals, perovskite compositions, and tourmaline components, and is at least one of or a compound of a plurality of the following group: a three way catalyst which oxidizes and reduces hydrocarbons, carbon monoxide, and oxides of nitrogen; an oxide catalyst which oxidizes hydrocarbons, carbon monoxide, NO, SOF, and carbon components; an NOx reducing catalyst which reduces NOx; and a catalyst which decomposes and removes sulfides, volatile organic gas VOC (Gaseous Organic Compounds), and dioxins. Regardless of the components of the catalyst, contact reaction between the exhaust gas and the catalyst must be accelerated and the catalyst must be activated at an early stage, so an undulated-wall honeycomb structure is advantageously used as the carrier for the catalyst.

An exhaust gas purification catalytic converter is providing using only the undulated-wall honeycomb structure carrying such catalysts. Also provided is an exhaust gas purification catalytic converter system comprising a plurality of this exhaust gas purification catalytic converter and a plurality of catalytic converters wherein the catalyst is carried on a normal flat-wall honeycomb structure, wherein the catalytic converters are serially alternately arrayed. Of course, the arrangement may involve arraying both undulated-wall honeycomb structure and flat-wall honeycomb structure for carrying catalyst within one converter, rather than dividing the converter.

For other arrangements, an exhaust gas purification catalytic converter system is also provided, wherein the catalytic converter using the undulated-wall honeycomb structure is placed to the upstream side of the exhaust, and the fine particle removing filter using the undulated-wall honeycomb structure is placed to the downstream side of the exhaust. For the aft fine particle-removing filter, one comprising a normal flat-wall honeycomb structure may be used.

The undulated-wall honeycomb structure according to the present invention may also be applied to an exhaust gas purification system for capturing fine particle substances in the exhaust gas. The undulated-wall honeycomb structure is electrically charged, normally positively, so as to capture fine particle substances this has been electrically charged negatively, normally. Depending on what is to be captured, the undulated-wall honeycomb structure may be electrically charged negatively.

Exhaust gas purification systems using the undulated-wall honeycomb structure in the same way may be used for capturing fine particle substances using non-thermal equilibrium plasma (non-thermal plasma) or microwave discharge plasma. Undulated-wall honeycomb structures applied to such exhaust gas purification systems are preferably of a readily exchangeable cartridge type.

Other examples of applications of the undulated-wall honeycomb structure according to the present invention include as a catalyst carrier for modifiers for fuel cell systems or for the fuel cells themselves, as part of a fuel tank evaporation system for suppressing external leakage of volatile components of fuel, or even as a sandwich panel.

According to the present invention, as one manufacturing method for such an undulated-wall honeycomb structure, a method is provided wherein a back plate having adjacent through holes with differing material flow resistance is used as a nozzle material for extrusion forming. The back plate preferably changes in thickness from the outer portion toward the center portion, and the back plate preferably has through holes A and through holes B with changing hole diameters.

Also, according to the present invention, a manufacturing method for an undulated-wall honeycomb structure is provided wherein undulations are formed in metal foil by plasticity working beforehand, and the metal foil is wrapped in a corrugated manner, thereby forming a metal honeycomb structure.

BRIEF DESCRIPTION OF THE DRAWINGS

FIGS. 1(a) and (b) are cross-sectional diagrams illustrating an embodiment of the undulated-wall honeycomb structure according to the present invention.

FIG. 2 is a cross-sectional diagram illustrating another embodiment of the undulated-wall honeycomb structure according to the present invention.

FIG. 15 (a) through (e) are cross-sectional diagrams illustrating yet another embodiment of the undulated-wall honeycomb structure according to the present invention.

BEST MODE FOR CARRYING OUT THE INVENTION

Figure 3:
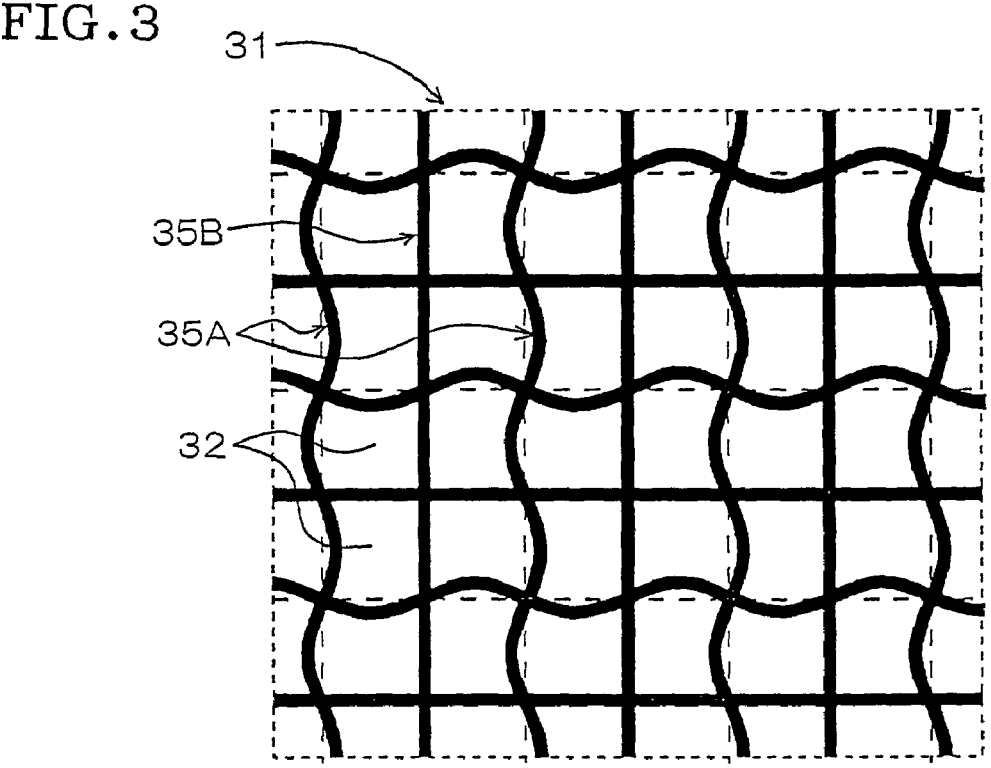
FIG. 3 is a cross-sectional diagram illustrating yet another embodiment of the undulated-wall honeycomb structure according to the present invention.

The following is a description of embodiments of the present invention with reference to the drawings, but it is needless to say that the present invention is not restricted to the following embodiments.

FIGS. 1 (a) and (b) illustrate an embodiment of the undulated-wall honeycomb structure according to the present invention, wherein the walls of a normal honeycomb structure with a quadrangle (square) cell shape for the cross-section (hereafter referred to as "cell passage cross-section") perpendicular to the cell passage direction (meaning the passage direction of the cell passage) have been formed in an undulated shape. Hereafter, normal honeycomb structures will be referred to as "normal honeycomb structure" or "flat-wall honeycomb structure". "Undulated-wall honeycomb structure" means a honeycomb structure wherein undulated walls exist, and also includes configurations wherein all walls are formed as undulated walls.

FIG. 1 (a) shows the cell passage cross-section of the undulated-wall honeycomb structure 1, with the passage direction of the cell passage 2 as the Z-axial direction, and orthogonal coordinate axes on a plane perpendicular thereto as the X-axis and Y-axis. FIG. 1 (a) also shows the position of the walls of had this not been an undulated-wall honeycomb structure, i.e., the walls of a normal honeycomb structure, with dotted lines. Also, FIG. 1 (b) shows a cross-section (an X-Z plane) along the line A-A' in FIG. 1 (a) and is parallel to the cell passage 2; conversely, FIG. 1 (a) is an X-Y plane along the line B-B' in FIG. 1 (b).

With the undulated-wall honeycomb structure 1, the multiple cell passages 2 are formed such that the passage directions thereof are mutually parallel. The intersection portions 4 between the walls 3 which partition the cell passages 2 are positioned systematically with a predetermined pitch D therebetween on the cell passage cross-section.

Now, the predetermined pitch D of the intersection portions 4 means that the intersection portions 4 are positioned maintaining a predetermined pitch D so as to be positioned at the apexes of the of the square cells, i.e., at the intersection of the lattices, as with the intersection portions in normal honeycomb structures with square cell passage cross-sections, as can be easily understood from the array of the intersection portions 4 alone. Also, the intersection portions 4 being positioned systematically means, in the case of the undulated-wall honeycomb structure 1, formed at the apexes of the square cells, i.e., at the intersections of the lattice. Accordingly, with triangle cell honeycomb structures and hexagon cell honeycomb structures, the positions of the apexes of the triangular and hexagonal cells are the systematic position where intersecting portions are formed.

Now, the wall face portions 5 of the walls 3 excluding the intersection portions 4 are formed having undulated shapes in both directions of the passage direction of the cell passages 2 and the passage cross-section direction. As described above, FIG. 1 (a) is an X-Y plane along line B-B' in FIG. 1 (b), so the wall face portion that is protruding in the positive direction of the Y axis in FIG. 1 (a) is recessed in the positive direction of the Y axis on the X-Y plane along the line C-C' in FIG. 1 (b) which is ½ wavelength of the waveform away in the Z-axial direction. In the same way, the wall face portion that is recessed in the positive direction of the Y axis is protruding in the positive direction of the Y axis, and this pattern also holds true in the X-axial direction.

Figure 28A:
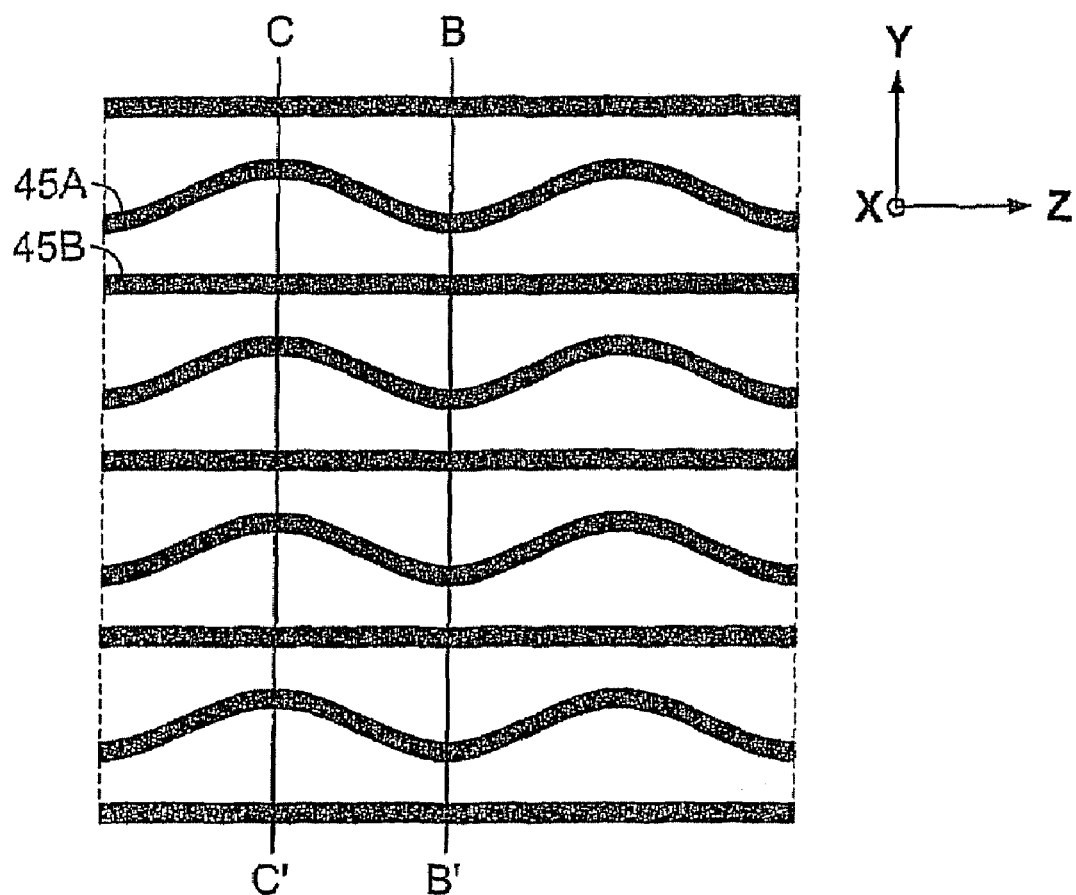
FIG. 28A is an exemplary cross-sectional diagram shown in a direction parallel to gas flow.

Forming the wall face-portions 5 of the walls 3 so as to be deformed in an undulated shape in both the cell passage direction and the cell passage cross-section direction (see, e.g. FIGS. 1A, 1B and 28A) as with the undulated-wall honeycomb structure 1 not only increases the surface area of the walls 2 so that the interaction between the exhaust gas and the walls 3 can be increased, but the flow of the exhaust gas through the cell passages 2 can be made into a non-stationary flow by the cross-sectional form of the cell passages 2 changing while the cross-section area thereof is almost constant, thereby increasing interactions between the exhaust gas and the walls 3 even further. Thus, the catalyst properties can be improved. FIG. 28A is an exemplary cross-sectional diagram in a direction parallel to gas flow, wherein a cross-section area continuously changes in the gas-flow direction with the undulated-wall honeycomb structure, and wherein the recessions and protrusions are synchronized (i.e. in-phase).

FIG. 2 illustrates another embodiment of the undulated-wall honeycomb structure according to the present invention, showing an arrangement the same as the cell passage cross-section in FIG. 1 (a). With the cell passage 2 in FIG. 1 (a), of the two sets of wall face portions 5 facing one another to define the cell passage 2, one set of wall face portions had the respective protrusions facing one another and the other set of wall face portions had the respective recessions facing one another, but with the undulated-wall honeycomb structure 11 shown in FIG. 2, the two sets of wall face portions 15 facing one another to define the cell passage 12 are arranged so that both sets have either the protrusions or the recessions facing one another.

Forming the wall face portions 15 thus means that the cross-section area of the cell passage 12 continuously changes in the passage direction, so the flow of the exhaust gas becomes non-stationary, further increasing the effects of interaction between the exhaust gas and the walls, which is advantageous in that purification properties can be improved.

The formed state of the recessions and protrusions on the wall face portions are not restricted to the forms of the above undulated-wall honeycomb structures 1 or 11. That is, the undulated recessions and protrusions on one set of opposing walls may be arranged such that the protrusions face one another and the recessions face another on one set of wall face portions, or may be arranged such that the protrusions and the recessions face one another.

For example, as shown in FIG. 1 (*a*) and FIG. 2, examining the recessions and protrusions of the wall face portions 5 and 15 in the vertical and horizontal directions of the undulated-wall honeycomb structures 1 and 11, with regard the one cell passage 2, the protrusions are formed facing one another and the recessions are formed facing one another, but the only difference is the form (cycle) thereof. Accordingly, an arrangement may be made wherein the protrusions face one another and the recessions face one another for the vertical walls, while the recessions and protrusions face one another for the horizontal walls.

However, in the event that a structure is used wherein the recessions and protrusions face one another for both the vertical and horizontal walls, the flow of gas within the cell passage readily becomes a stationary flow, leading the problems that good purification capabilities cannot be readily obtained, as described above with reference to JP-A-5-123580.

Figure 5:
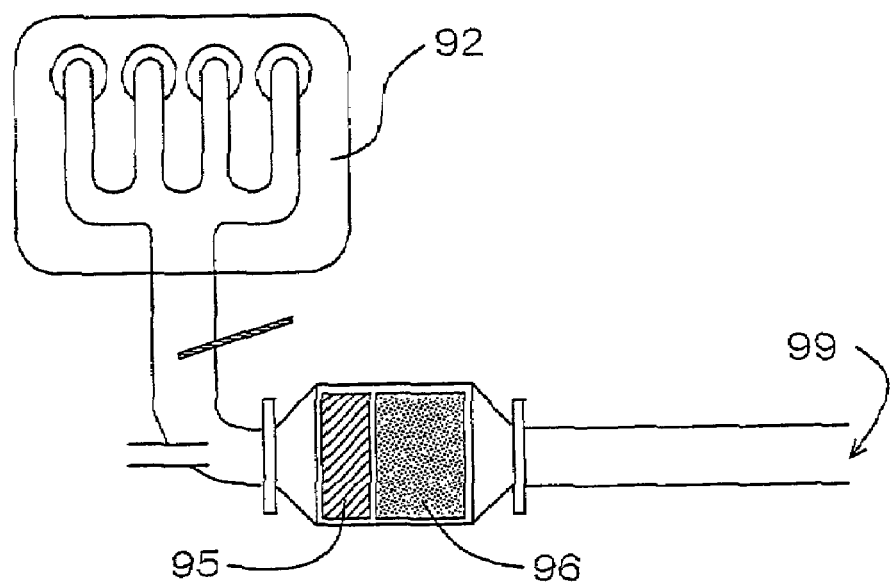
FIG. 5 is an explanatory diagram illustrating an example of a positional arrangement in a case of using the undulated-wall honeycomb structure as an exhaust gas purification catalyst carrier.

Incidentally, with the undulated-wall honeycomb structures 1 and 11, increased pressure loss in unavoidable. In order to circumvent this problem in the event of using the undulated-wall honeycomb structures 1 and 11 as exhaust gas purification catalyst carriers, an arrangement can be made wherein the catalyst member formed by the undulated-wall honeycomb structure carrying catalyst is divided two ways in the direction of the flow of exhaust gas near the engine 92 wherein the exhaust gas temperature is particularly high and the effects of pressure loss are great, as shown in FIG. 5, and the catalyst member 95 using the undulated-wall honeycomb structure is positioned toward the front (toward the engine 92) while a catalyst member 96 using a normal honeycomb structure is positioned to the rear (toward the exhaust pipe 99), and also the length of the catalyst member 95 using the undulated-wall honeycomb structure is made to be shorter than the catalyst member 96 using a normal honeycomb structure toward the rear. Thus, the high purification capabilities of the undulated-wall structure can be attained while suppressing the effects of pressure loss. In addition, an arrangement wherein the normal honeycomb structure is positioned toward the front and a low-density undulated-wall honeycomb structure is positioned toward the rear may be used, as well.

Also preferably used is an arrangement wherein the degree of undulated deformation of the undulation-shaped walls is greater at the periphery portion as compared to the center portion, so that exhaust gas essentially cannot pass through the periphery portion, i.e., so that the cell passages are essentially closed off. Thus, the advantages of prevention of discharging heat from the periphery portion of the honeycomb structure, mechanical strengthening of the periphery portion, and prevention of carrying excessive precious metal components at the periphery portion, can be obtained, as disclosed in JP-A-49-63821 and JP-A-56-129042.

The amount of undulated deformation of the walls is preferably 150% or more of the wall thickness in amplitude. In the event that the amplitude of the undulated walls is less than 150%, sufficient emission exhaust amount reducing effects cannot be obtained. This is thought to be due to increasing amplitude of the undulated walls increases the agitating effects of the flow of exhaust gas within the cell passages, but increasing the swells of the undulations on the undulated wall, i.e., increasing the amplitude invites increase in pressure loss, so there is so there is the need to set the amplitude appropriately while finding the limit of tolerance of pressure loss.

Now, FIG. 3 is a cross-sectional diagram illustrating yet another embodiment of the undulated-wall honeycomb structure according to the present invention, showing an arrangement the same as the cell passage cross-section in FIG. 1 (*a*). The undulated-wall honeycomb structure 31 shown in FIG. 3 is an arrangement wherein wall face portions 35A with undulated recessions and protrusions formed, and wall face portions 35B having flat surfaces, existing in a mixed fashion. The cell passages 32 have a flat shape wherein adjacent walls forming two sides are flat and the other adjacent walls forming two sides are formed with undulated shapes. Such an undulated-wall honeycomb structure 31 can also be described as a normal honeycomb structure with square-shaped cell cross-sections having every other flat wall thereof replaced with undulated walls.

In the case of an arrangement wherein undulated wall face portions 35A and flat wall face portions 35B exist in a mixed fashion as with the undulated-wall honeycomb structure 31, the properties manifested such as catalyst capabilities and mechanical strength are intermediate between those of arrangements wherein all walls are undulated and those of arrangements wherein all walls are flat, as described later. In the event that all walls are undulated, pressure loss increases, so the undulated-wall honeycomb structure 31 can be suitably used for cases such as improving catalyst properties while suppressing increase in pressure loss.

Figure 4:
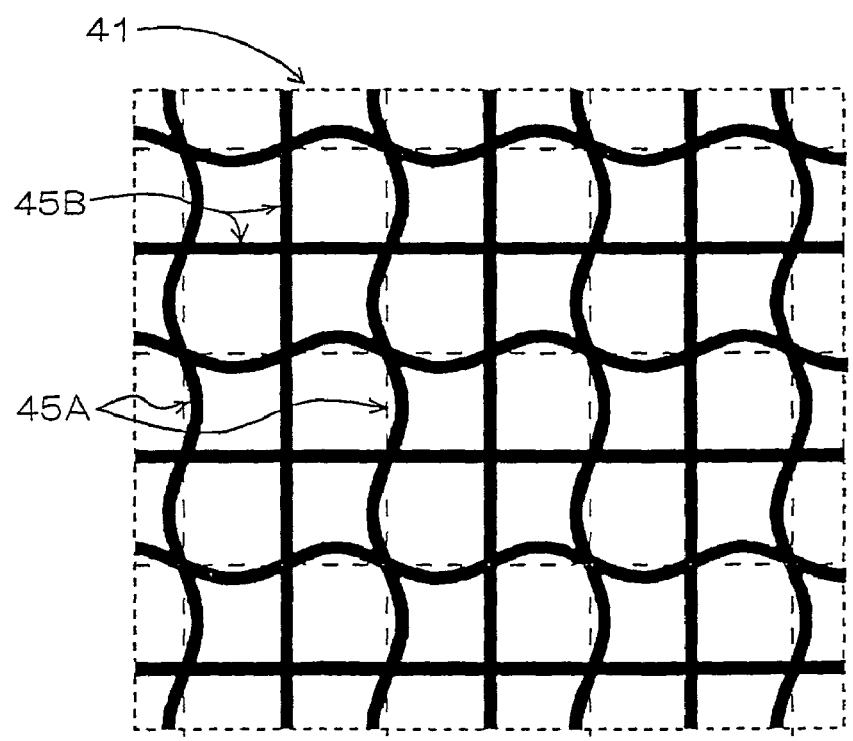
FIG. 4 is a cross-sectional diagram illustrating yet another embodiment of the undulated-wall honeycomb structure according to the present invention.

FIG. 4, like FIG. 3, is a cross-sectional diagram illustrating an arrangement of an undulated-wall honeycomb structure 41 wherein undulated walls 45A and flat walls 45B exist in a mixed fashion. Comparing the undulated-wall honeycomb structures 31 and 41 reveals that the recessions and protrusions of the walls 35A and 45A are facing in different directions. In other words, the cross-section area of the cell passage cross-section in the passage direction is almost constant with the undulated-wall honeycomb structure 31, but the cell passage cross-section area continuously changes with the undulated-wall honeycomb structure 41, so that wide and narrow areas are formed. Accordingly, with the undulated-wall honeycomb structure 41, the exhaust gas flow becomes non-stationary as compared to that of the undulated-wall honeycomb structure 31, so the effects of interaction between the exhaust gas and the walls increase, which is advantageous in that the purification capabilities are improved.

With the undulated-wall honeycomb structure according to the present invention, cell passages formed by walls formed into undulated shapes preferably appear non-continuously. An arrangement wherein the area of cells defined by the undulated walls are not formed uniformly throughout the honeycomb structure and wherein flat-wall cell areas wherein all walls including outer walls are normal walls, are mixed, results in the flow of fluid flowing into and out of the honeycomb structure being agitated, such that the effects of contact between the fluid and the cell walls at the entrances and exits of the cell passages can be improved.

FIG. 15 (a) through (e) are cross-sectional diagrams illustrating embodiments of the undulated-wall honeycomb structure, showing vertical cross-sections as to the cell passages. The cross-section of the honeycomb structure may be round, or also may be oval or ellipse, or have a modified cross-section or the like, thereby adjusting the influx speed distribution of the fluid into the honeycomb structure, thereby making the influx speed distribution uniform. Various patterns of undulated-wall cell passages 21 and flat-wall cell passages 22 are arranged on the cross-sections.

FIG. 15 (a) through (c) are examples of undulated-wall honeycomb structures wherein an area made up of flat-wall cell passages 22 and an area made up of undulated-wall cell passages 21 alternately appearing, FIG. 15 (d) is an example of an undulated-wall honeycomb structure wherein areas made up of the flat-wall cell passages 22 are arranged in a in lines of a certain width in grid-like fashion within areas of undulated-wall cell passages 21, and FIG. 15 (e) is an example of an undulated-wall honeycomb structure wherein the cross-section is oval, and an approximately square area made up of undulated-wall cell passages 21 is positioned within flat-wall cell passages 22.

The present invention is not restricted to undulated-wall cell passages 21 and flat-wall cell passages 22 being arranged with a certain pattern as with these examples, but it is preferable that measures are taken to prevent unbalanced distribution on the vertical cross-section of the undulated-wall cell passages 21 where pressure loss is great, in order to reduce the pressure loss of the undulated-wall honeycomb structure while making unbalanced flow of gas more difficult to occur.

Figure 13A:
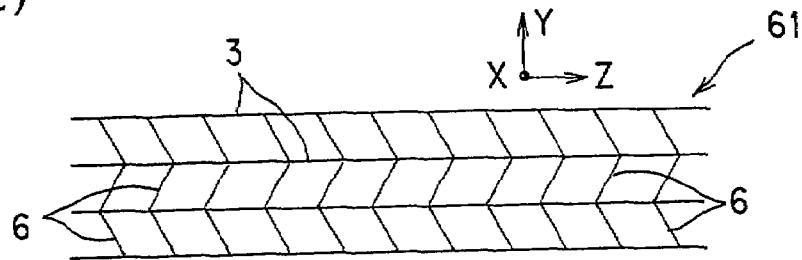
FIGS. 13 (a) and (b) are cross-sectional diagrams illustrating yet another embodiment of the undulated-wall honeycomb structure according to the present invention.
Figure 13B:
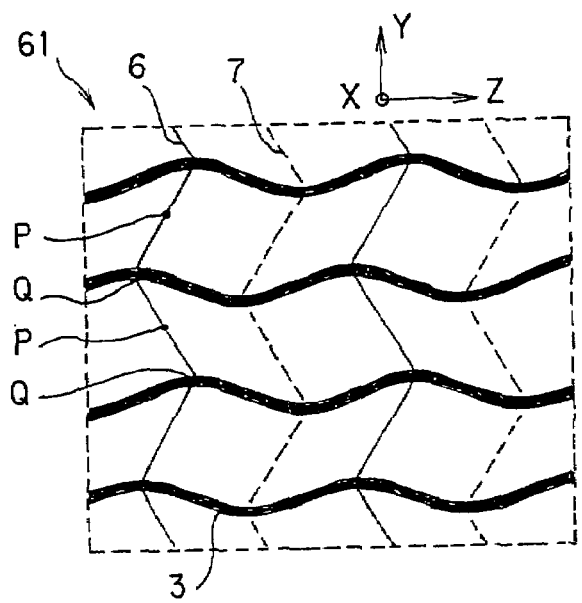

FIGS. 13 (a) and (b) illustrate yet another embodiment of the undulated-wall honeycomb structure according to the present invention, and as with FIGS. 1 (a) and (b), the passage direction of the cell passages is the Z-axial direction, and orthogonal coordinate axes X-axis and Y-axis are set on a plane perpendicular thereto. FIG. 13 (a) is a cross-section parallel to the cell passage, i.e., a cross-section illustrating a portion of the continuous walls (on the Y-Z plane), and FIG. 13 (b) is an enlarged cross-sectional view of FIG. 13 (a).

With the undulated-wall honeycomb structure 61 shown in FIGS. 13 (a) and (b), lines connecting the highest points of the protrusions and the lowest portions of the recessions on the undulated wall face portions formed in the cell passage direction are formed in an undulated manner in the perpendicular direction (in the Y direction on the Y-Z plane) to the cell passage direction on the wall faces.

In comparison, with the undulated-wall honeycomb structure 1 shown in FIGS. 1 (a) and (b), when viewing the rising of the undulations in the Y direction on the Y-Z plane, protrusion faces and recession faces alternately appear, and a line connected the apexes of the protrusion faces is a straight line as shown in FIG. 1 (b), but conversely, with the undulated-wall honeycomb structure 61 shown in FIGS. 13 (a) and (b), the protrusions faces and recession faces are each connected, such that the undulations, or in other words the line 6 of the apex portion of the protrusions and the line 7 of the low point of the recessions meander systematically. Using the analogy of mountains, with the undulated-wall honeycomb structure 1 shown in FIGS. 1 (a) and (b), when looking at the mountains in the Y direction on the Y-Z plane, the line connecting the peaks of the mountains is a straight line, but with the undulated-wall honeycomb structure 61 shown in FIGS. 13 (a) and (b), the mountains form a mountain range, and the edge line meanders systematically.

Forming the line 6 of the apex portion of the protrusions and the line 7 of the low point of the recessions so as to undulate in a direction perpendicular to the cell passage direction as with the undulated-wall honeycomb structure 61 increases the cushioning properties in the cross-sectional direction of the honeycomb structure, and not only do strength and heat shock resisting properties improve, but also the cross-sectional area of the cell passages continuously greatly change in the cell passage direction, to a degree even greater than the undulated-wall honeycomb structure 11 shown in FIG. 2, so the exhaust gas flow becomes a turbulent flow, thereby increasing interaction between the exhaust gas and the wall, thus improving purification capabilities.

With the undulated-wall honeycomb structure 61, the height of the protrusions with the flat-face wall as a reference may be constant or may change, and it is also preferable that the point P on the line 6 of the high points of the protrusion shown in FIG. 13 (b) be protruding most and the point Q be somewhat low. Making analogy to mountains, the point P is a peak, and the point Q is a saddle. Such additional changes in recessions and protrusions furthers the turbulence of the exhaust gas flow, and the interaction between the exhaust gas and the walls increase even more.

Figure 14:
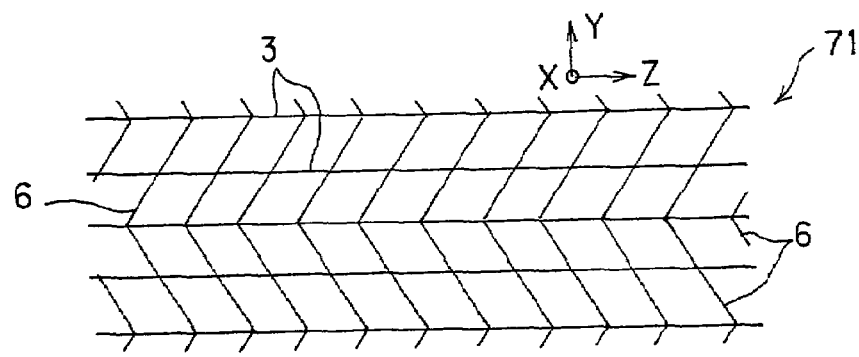
FIG. 14 is a cross-sectional diagram illustrating yet another embodiment of the undulated-wall honeycomb structure according to the present invention.

Also, the systematic meandering of the line 6 of the apex portion of the protrusions and the line 7 of the low point of the recessions in a direction perpendicular to the cell passage direction is not restricted to the pattern shown in FIG. 13(a) wherein the directions of the line 6 of the apex portion of the protrusions and the line 7 of the low point of the recessions change with each cell passage, nor to the pattern in honeycomb structure 71 shown in FIG. 14 wherein the directions of the line 6 of the apex portion of the protrusions and the line 7 of the low point of the recessions change every two cell passages.

As described above, with such an undulated-wall honeycomb structure, cushioning properties in the cell passage cross-sectional direction further increases, and increases can be made in isostatic strength and heat shock resisting properties, and further the effects of contact between the fluid flow and the cell walls within the cells can be increased even more. As one example, with a cell structure 0.05 mm in cell wall thickness and 900 cpsi in cell density, an undulated-wall honeycomb structure (a cordierite honeycomb structure) with an external diameter of 100 mm, length 150 mm, and outer wall thickness of 0.15 mm for the honeycomb structure was manufactured, and isostatic strength was compared with a normal honeycomb structure made up of flat walls with the same cell structure and the same size, yielding results that strength was improved by approximately 10% on the average, and heat resistant shock improved by approximately 5% on the average.

Similar effects have been confirmed with low cell density honeycomb structures having relatively great opening percentages, within the range of cell density of 200 to 600 cpsi, with cell wall thickness of 0.01 to 0.12 mm. This means that undulated-wall structures are effective as means for strengthening low cell density honeycomb structures wherein the isostatic strength level is low. Of course, the above effects do not change whatsoever with cell structures exceeding 900 cpsi, such as 1200 cpsi, and so forth.

Figure 16:
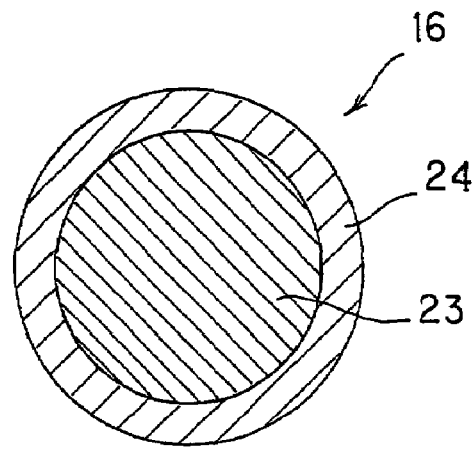
FIG. 16 is a cross-sectional diagram illustrating yet another embodiment of the undulated-wall honeycomb structure according to the present invention.

FIG. 16 illustrates yet another embodiment of the undulated-wall honeycomb structure according to the present invention, showing the form of the cell passage cross-section. Single or multiple cells are formed of normal walls, i.e., flat face walls, including the outer wall, in ring-like fashion from the periphery portion of the undulated-wall honeycomb structure 16 toward the inside, the inside portion is an area formed in an approximate circle containing cells made up of undulated walls, and the wall thickness of the flat thick wall portion 24 which is the ring-shaped flat wall area is suitable made to be thicker in stages than the wall thickness of the undulated thin wall portion 23 which is an area containing internal undulated walls, thereby improving the isostatic strength of the honeycomb structure in comparison with arrangements wherein the entirety is made of undulated-wall structures.

As an example, an undulated-wall honeycomb structure 16 shown in FIG. 16 (a cordierite honeycomb structure) with wall thickness of 0.035 mm for the undulated thin wall portion 23, having flat thick wall portion 24 from the periphery portion to the inner side of 14 cells, with wall thickness of 0.115 mm to the inner side of 10 cells from the periphery portion and wall thickness of 0.075 mm from there to the inner side of 4 cells, the arrangement being a cell structure 900 cpsi in cell density, with the external diameter of the honeycomb structure being 110 mm, length of 150 mm, and outer wall thickness of 0.15, and comparison was made with an undulated-wall honeycomb structure of the same cell structure and same size but with the entirety made of undulated-wall structures, yielding results that isostatic strength was improved by approximately 15% on the average.

Next, the method of manufacturing the undulated-wall honeycomb structure described above will be described. Extrusion forming, which is used most commonly for conventional honeycomb structure manufacturing, can be used for manufacturing the undulated-wall honeycomb structure according to the present invention. The cross-sectional diagrams FIG. 6 (*a*) through (*c*) illustrate the schematic configuration and structure of the nozzle 50 used for extrusion forming. Here, FIG. 6 (*a*) shows the cross-section along line A-A' in FIG. 6 (*c*), and FIG. 6 (*b*) shows the cross-section along line B-B' in FIG. 6 (*c*).

The nozzle 50 is overall formed of a back plate 51 wherein through holes 52A and 52B are formed, a back hole channel member 54 where back holes 53 are formed, and a slit member 56 where slits 55 are formed. Now, changing the diameter and depth (thickness of the back plate) of the through holes 52A and 52B formed in the back plate 51 allows the resistance of the forming material (hereafter referred to as "material") as to fluid motion, and thus the flow of extruded material can be adjusted.

Also, the back hole channel member 54 serves to lead the material to the slits 55, and generally, the positioning is such that the intersecting portions of the walls of the honeycomb structure match the center of the back holes 53. The slit member 56 defines the form and structure of the honeycomb structure, and the material extruded from the slits form the walls.

The material passes through in the order of the through holes 52A and 52B, the back holes 53, and the slits 55, but the material which has come out from one back hole 53 and the material which has come out from an adjacent back hole 53 both flow through the slits 55 and merge within the slit 55 between both back holes 53, and come into close contact so as to form the walls of the honeycomb structure while being continuously extruded.

Now, looking more closely at two adjacent back holes 53, in the event that the material flow volume coming from one back hole 53 and the material flow volume coming from the other back hole 53 are equal, the wall of the honeycomb structure is formed straight, and a normal honeycomb structure is obtained. However, in the event that there is relative difference in the material flow volume between the two adjacent back holes 53, the balance of the flow of material within the slit 55 collapses, and more material attempts to come out at certain portions, resulting in the wall being bent.

At the time of extrusion forming, this force bending the wall serves as a vibrating force, so the wall vibrates and undulates in the cell passage direction, and also in the cell passage cross-sectional direction the reaction causes the adjacent wall to be bent in the opposite direction, so viewing walls in a row in the cell passage cross-sectional direction should also reveal undulations.

According to the present invention, undulations are formed in the walls of the honeycomb structure by creating differences in such material flow volumes. Specifically, either the diameter of the through holes formed in the back plate is changed continuously from the periphery portion toward the center portion, or the back plate is formed in a recessed form such that the thickness decreases from the periphery portion toward the center portion, or the opposite thereof. Thus, the material flow resistance is continuously changed from the periphery portion toward the interior, thereby enabling making difference in the flow resistance of adjacent through holes, whereby undulated-wall honeycomb structures 1 and 11 shown in FIG. 1 and FIG. 2 above with all walls being formed having undulated shapes, can be obtained.

Figure 6A:
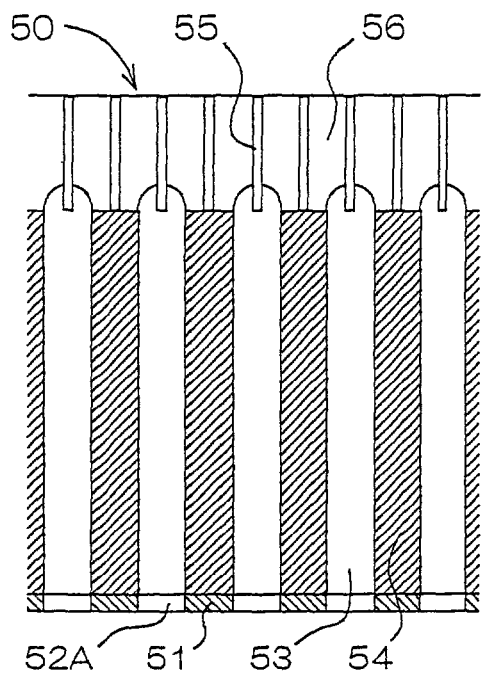
FIG. 6 (a) through (c) are cross-sectional diagram illustrating a schematic configuration of nozzles suitably used for extrusion forming of the undulated-wall honeycomb structure according to the present invention.
Figure 6B:
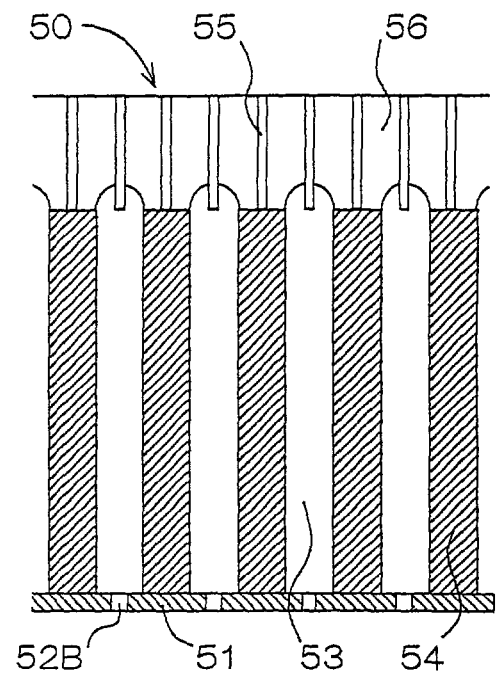
Figure 6C:
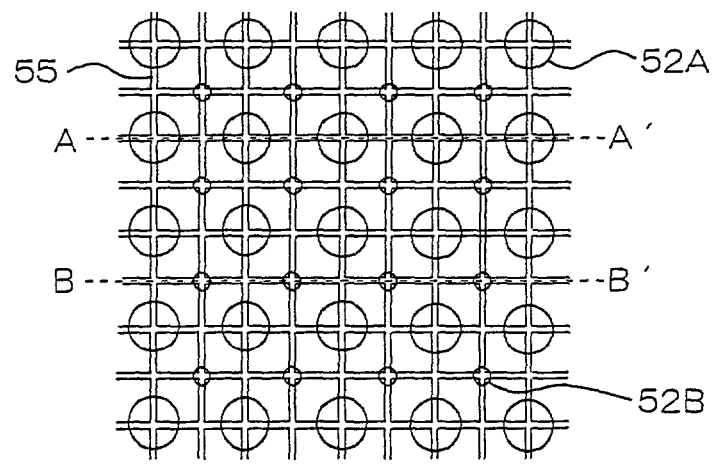

Also, as shown in FIG. 6 (*a*) through (*c*), arraying the through holes 52A in a lattice form, arraying the through holes 52B such that a through hole 52B is positioned at the center of four through holes 52A forming a square, and changing the diameters of the through holes 52A and the through holes 52B, and using a back plate 51 with such an arrangement, causes walls formed at positions connecting the through holes 52A with the larger diameter to be undulated, and walls formed at positions connecting the through holes 52B with the smaller diameter to be straight. Thus, undulated-wall honeycomb structures 31 and 41 such as shown in FIG. 3 and FIG. 4 with mixed undulated walls and flat walls can be obtained.

Now, examples of materials which can be used for manufacturing the undulated-wall honeycomb structure according to the present invention include ceramic materials such as cordierite, alumina, mullite, lithium aluminum silicate, aluminum titanate, zirconia, silicone nitride, aluminum nitride, and silicon carbide; or heat-resistant metal materials such as stainless steel; aluminum alloy; and adsorbents such as activated charcoal, silica gel, and zeolite. Regarding the ceramic materials, one type of ceramic material may be used, of a composite thereof may be used.

Undulated-wall honeycomb structures can be obtained according to the configuration of the forming nozzle with other materials as well, as long as the material is capable of extrusion formation, so similar effects as those of the above can be expected with materials wherein particles of differing material or fibers have been dispersed and compounded in the above materials or polymers such as resins, or articles wherein the wall surfaces have been covered following extrusion. In addition, in the case of wrapping metal foil in a corrugated manner to form a honeycomb structure, an undulated-wall honeycomb structure can be obtained by forming undulations in metal foil beforehand.

The porosity of the ceramic material or the adsorbent used is preferably between 45% to 80%. With undulated walls, the wall capacity per unit capacity increases as compared to normal flat wall structures, so the thermal capacity of the honeycomb structure increases. Accordingly, this is disadvantageous from the perspective of a catalyst carrier taking into consideration heating of the catalyst, but increasing the material porosity of the honeycomb structure suppresses increases in the heat capacity of the honeycomb structure.

Generally, for exhaust gas purification catalyst carriers for automobiles, cordierite honeycomb structures with an porosity of 25% to 35% are used, but with the undulated-wall honeycomb structure according to the present invention, the porosity of the material is suitably 45% or more and 80% or less.

Making the porosity of the material to be 45% or more means not only does the thermal capacity of the walls decrease, but the roughness of the wall surface also becomes more pronounced due to the micropores in the surface of the walls, further improving the effects of contact with the exhaust gas, and moreover, the walls are porous, so even the micropores within the walls are brought to use. The porous nature which allows air passage means that the article can be used as a filter for fine particle material, as well. In the event that the porosity exceeds 80%, the material strength drastically decreases and also the percentage of gaps in the walls become so great that the effectiveness of contact with the exhaust gas actually decreases.

Figure 17A:
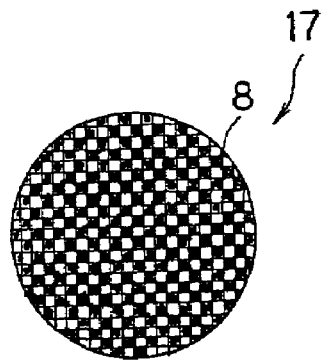
FIGS. 17 (a) and (b) are cross-sectional diagrams illustrating an embodiment in the event of applying the undulated-wall honeycomb structure according to the present invention as a fine particle substances removing filter.
Figure 17B:
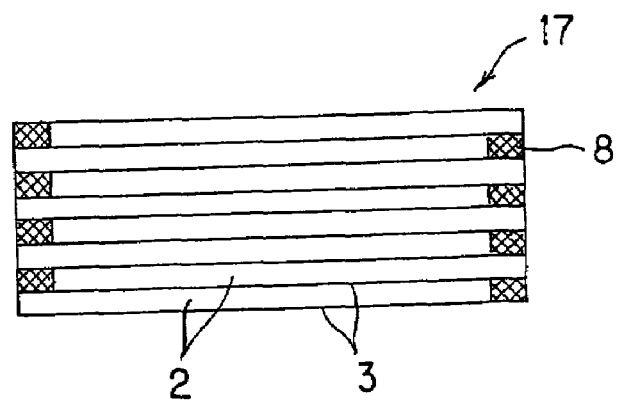

FIGS. 17 (a) and (b) are diagrams illustrating an embodiment of applying the undulated-wall honeycomb structure according to the present invention to a fine particle substances removing filter, and with a fine particle substances removing filter shown here, as an example an undulated-wall honeycomb structure 17 (a cordierite honeycomb structure) is manufactured with wall thickness of 0.3 mm, cell density of 300 cpsi, outer diameter of 144 mm, length of 152 mm, and porosity of 65%, and seals 8 of the same cordierite material are applied alternately to the cell passages 2 at both ends of the honeycomb structure, thereby manufacturing a fine particle substances removing filter wherein exhaust gas passes through the porous cell wall 3, and test results wherein measurement was made of the fine particle substances capturing effectiveness of the filter installed partway along a diesel engine exhaust pipe showed the capturing effectiveness of the undulated-wall honeycomb structure to be improved by approximately 10% on the average over a normal flat-wall honeycomb structure. In addition, the same effects have been confirmed with an undulated-wall honeycomb structure filter using silicon carbide as the material thereof. Further, in the case of using silicon carbide as the material, there are also results showing that the thermal shock resistance is approximately 20% improved on the average as compared to normal flat-wall honeycomb structures.

In the event of using the undulated-wall honeycomb structure according to the present invention as a fine particle substances removing filter, the wall thickness is preferably set to 0.2 to 1.2 mm, and the cell density to 50 to 600 cpsi. This thickness is sufficient to withstand use of the undulated walls as filter layers. In the event that the wall thickness is thinner than 0.2 mm. The particle capturing performing at the wall deteriorates greatly. In addition, in the event that the wall thickness is greater than 1.2 mm, the air passage resistance increases drastically, which is undesirable. In the event that the cell density is 50 cpsi or less, the wall surface area is too small, and the pressure loss level is too great. In the event that the cell density exceeds 600 cpsi, the cell opening area is too small, and the cells are readily clogged by fine particle substances or metal scaling, which is undesirable?

In addition, in case of using the undulated-wall honeycomb structure as fine particle substances removing filter, a design wherein the undulated-wall honeycomb structure is an easily replaceable cartridge facilitates maintenance work, which is desirable? In addition to fine particle substances, oxidized scales from the engine side, metal foreign objects, and ash components which remain after fine particle substances is processed, all clog the undulated-wall honeycomb structure filter, and pressure loss increases. Such components are difficult to process by catalysts, so an arrangement wherein the honeycomb structure is a cartridge that is replaced at the point that the pressure loss reaches a tolerance limit allows the system to be used over an extremely long time.

The undulated-wall honeycomb structure according to the present invention is also suitably used as a catalyst carrier. The undulated structure accelerates the contact reaction between the catalyst component held on the wall surface and the exhaust gas, the accelerated catalytic reaction generates catalytic reaction heat, which is advantageous in that the exhaust gas temperature rises early on and the catalyst is activated, and heating is improved for the time immediately after cold-starting the engine in particular, so emissions of HC, NOx, and CO can be reduced as compared to normal honeycomb structures. Also, not only gaseous components of HC, NOx, and CO, but also solid components having carbon as a nucleus which is the component of particulate substances emitted from diesel engines, and fine particle substances of SOF which is non-combusted components of fuel and oil, are more readily captured by the undulated wall structure as compared to a normal flat wall, and at the same time, fine particle substances can be purified more effectively due to the effects of the catalyst activated by higher temperatures. With normal flat-wall honeycomb structures, capturing fine particle substances on the wall surface is difficult, and the gas flow within the call passages is almost a laminar flow, so fine particle substances with particularly small diameter readily passes through the cell passages without any interaction. The undulated-wall structure according to the present invention allows fine particle substances with particularly small diameter to be captured by the wall surface without passing through unchecked.

In order to remove fine particle substances from the exhaust gas, often, an arrangement is used wherein the cell walls of the honeycomb structure are formed of a porous material with sufficient air passing properties, and the entrances and exits to the cell passages at both ends of the structure are alternately closed off in a staggered manner so as to form a filter structure, and exhaust gas is forcibly passed through the cell walls so as to physically capture the fine particle substances at the walls. With a method using such a filter configuration, the fine particle substances accumulate on the wall surfaces and in the micropores of the walls, so the pressure loss of the filter structure increases drastically. In this case, the fine particle substances which has accumulated is periodically burned and removed by exhaust gas heating with a heater provided upstream of the filter, thereby reviving the filter and restoring pressure loss. Or, a catalyst component is carried on the filter walls and the filter is revived by processing of the fine particle substances by the effects thereof, or an oxidizing catalyst is set upstream from the filter and the fine particle substances accumulated in the filter is processed thereby and the filter is revived. However, with these methods, sudden increase of pressure loss is not readily avoidable until reviving, and further ash components continue to accumulate on the walls following reviving, so over a long period the cells become clogged, inviting increased pressure loss.

With the present invention, in addition to the undulated-wall honeycomb structure 17 (fine particle substances removing filter) shown in FIGS. 17 (a) and (b) as shown above, catalyst is carried by the undulated-wall honeycomb structure, and the fine particle substances capturing properties and contact reaction properties with the catalyst are raised, thereby allowing the fine particle substances capturing capabilities of a filter structure wherein seals 8 are applied to be improved. Also, even in arrangement wherein the closed-off structure is not used, carrying catalyst improves the fine particle substances capturing capabilities as compared to normal flat walls, and there is temperature increase due to the contact reaction activation with the catalyst, so fine particle substances can be processed. These effects can be further improved by increasing the wall surface area by increasing the cell density and reducing the wall thickness to reduce thermal capacity. Increasing the cell density increasing the contact area between catalyst and exhaust gas, and the hydraulic diameter of the cell passage is reduced, so fine particle substances cannot readily pass through the cell passage all the way, and thus capturing properties at the wall are improved.

With the undulated-wall honeycomb structure used for such as catalyst carrier, the wall thickness is preferably around 0.01 to 0.12 mm. Thus, increase in pressure loss at the time of gas passage due to the walls being undulated can be suppressed, and high thermal capacity which is a problem at the time of carrying catalyst can be suppressed. Making the wall thickness to be 0.1 mm or less allows pressure loss and thermal capacity to be further reduced, which is even more preferable. However, in the event that the wall thickness is too thin, the strength of the walls themselves is insufficient, so the wall thickness should be 0.01 mm or more. Also, in the event that the wall is formed of a metal material, making the walls to thin results in marked deterioration in acid resistance or corrosion resistance under high temperature environments, which is undesirable.

In addition, the cell density is preferably around 200 to 3000 cpsi. In the same way as making the wall thickens thinner, this suppresses high thermal capacity which is a problem at the time of carrying the catalyst, and also strength necessary for the honeycomb structure can be ensured. Further, GAS (geometric surface area) can be sufficiently obtained, so contact efficiency between the gas and walls improves. In the event that the cell density is less than 200 cpsi, the wall surface area is too small, and improvement in catalyst properties is insufficient. Catalytic purification efficiency will improve as the cell density is increased even with a honeycomb structure having normal flat walls, but the catalytic purification efficiency levels off at around 1000 cpsi. On the other hand, when using an undulated-wall honeycomb structure, the catalytic purification efficiency did not level off even above 1000 cpsi or so. However, there was little improvement in catalytic purification efficiency after exceeding around 3000 cpsi.

Figure 24:
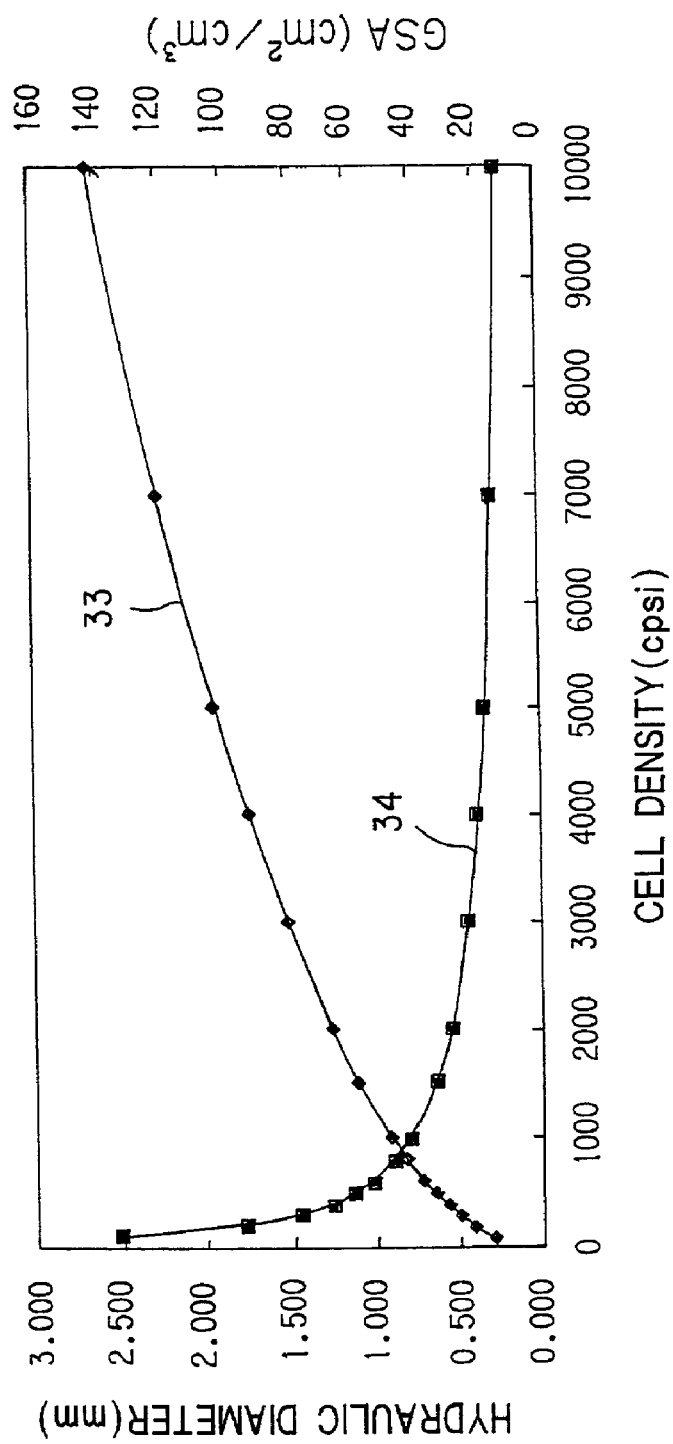
FIG. 24 is an explanatory diagram illustrating an example of the relation between cell density in the honeycomb structure and cell hydraulic diameter and GSA.
Figure 25:
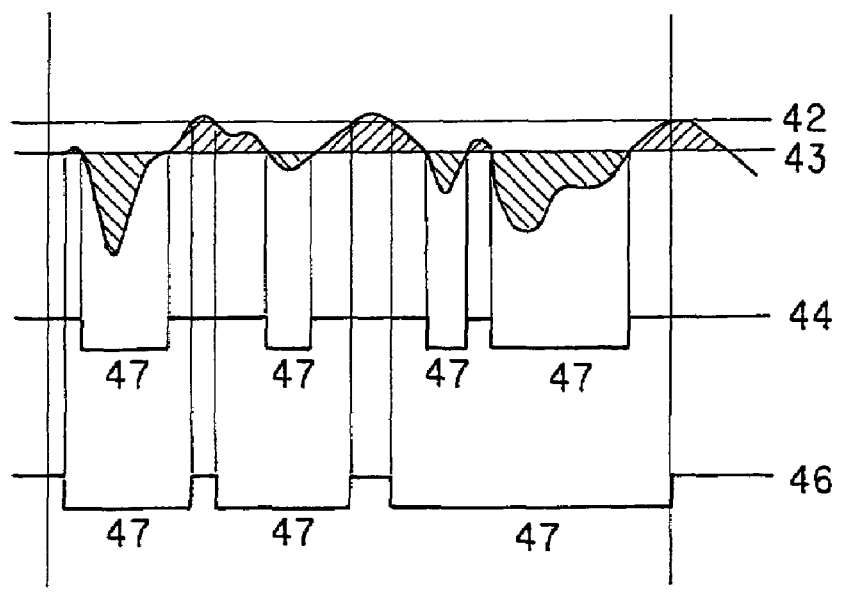
FIG. 25 is an explanatory diagram illustrating Valley Level for the wall surface roughness in the honeycomb structure.

FIG. 24 shows an example of a relational line 34 of the relation of the cell density of a flat-wall honeycomb structure and the hydraulic diameter within the cells, and a relational line 33 of the relation between the cell density and the geometric surface area GSA. As can be understood from this diagram, the hydraulic diameter decreases as the cell density increases, but the degree of decrease lessens from around 1000 cpsi, and further lessens from around 3000 cpsi. Reduction in the hydraulic diameter reduces the spatial distance between the molecules in the exhaust gas and the wall surface within the cells, meaning that the probability of contact between gas molecules and wall surface increases, so it can be though that catalytic purification effectiveness is improved by the increased probability of contact between the gas molecules and wall surface from around 1000 cpsi to around 3000 cpsi.

On the other hand, the geometric surface area GSA of the cell walls increases as the cell density increases, but the degree of increase lessens from around 1000 cpsi, and further lessens from around 3000 cpsi. Increase of GSA means that the contact area of the gas molecules and the wall surface increases, so it is thought that catalytic purification effectiveness improves by the synergistic effect of reduction in hydraulic diameter and increase in GSA up to around 1000 cpsi. However, from around 1000 cpsi on, the degree of decrease in hydraulic diameter and the degree of increase in GSA both decrease, and accordingly it can be though that this is why the effectiveness levels off at with normal-wall honeycomb structures. Further, the dispersion effect of catalyst component accompanying increase in GSA becomes excessive, and the catalyst component becoming thin can also be considered as a factor. Using an undulated-wall honeycomb structure makes the gas flow within the cell passages to be non-stationary, and further the hydraulic diameter of the cells change so the contact effect between the gas molecules and the wall surface is greatly improved, and consequently it can be thought that the catalytic purification effectiveness does not level off at around 1000 cpsi and even up to around 3000 cpsi. It is thought that the contrary effects of increased GSA caused the effectiveness to level off after around 3000 cpsi, but it is expected that a certain amount of improvement can be made by increasing the amount of catalyst held.

Figure 18A:
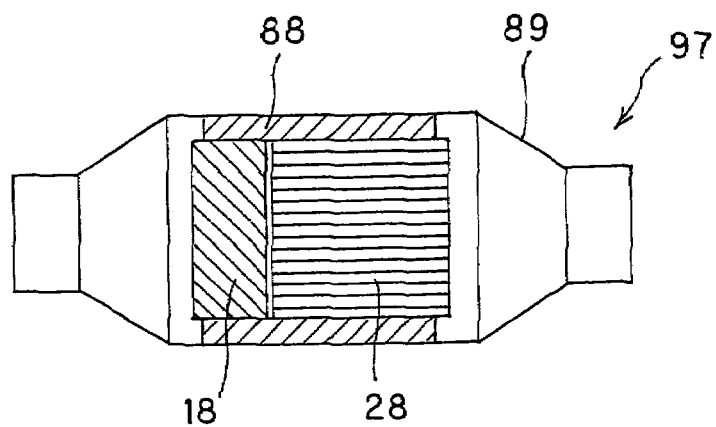
FIGS. 18 (a) and (b) are explanatory diagrams illustrating an example of a positional arrangement for using the undulated-wall honeycomb structure according to the present invention as an exhaust gas purification catalytic converter.
Figure 18B:
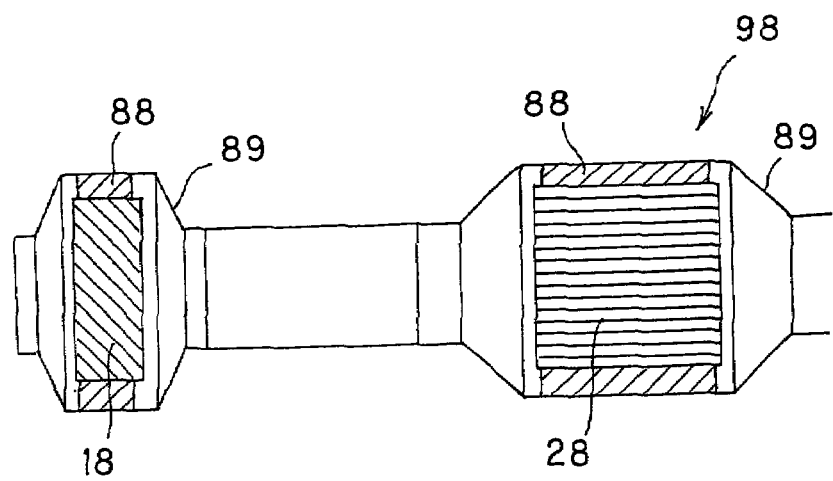

FIGS. 18 (*a*) and (*b*) are explanatory diagrams showing an example of a positional arrangement for using the undulated-wall honeycomb structure according to the present invention as an exhaust gas purification catalytic converter. As already described with reference to FIG. 5, the undulated-wall honeycomb structure according to the present invention can be suitably used as a vehicle exhaust gas purification catalyst carrier. FIG. 18(*a*) shows an exhaust gas purification catalytic converter system 97 wherein an undulated-wall honeycomb structure 18 is disposed at the exhaust upstream side at the front, and a flat-wall honeycomb structure 28 is disposed in mounting member 88 at the exhaust downstream side at the back, so as to serially link the two and store in a single converter. In this case, the undulated-wall honeycomb structure 18 has a so-called catalyst light-off function, wherein the catalyst is activated early on after starting the engine, raising the exhaust gas temperature, so as to activate the catalyst in the latter structure early on after staring the engine and purify the harmful components within the exhaust gas. The former is for lighting the catalyst, and accordingly the honeycomb structure 18 is preferably relatively small in capacity, thus allowing the length of the honeycomb structure 18 to be shortened, which lends to reducing pressure loss.

As shown in FIG. 18 (*b*), an arrangement may be made wherein the structures are not stored within one converter, but are separated and installed and fore and aft converters. Such an exhaust gas purification catalytic converter system 98 is preferable since the freedom in design of the vehicle exhaust system increases. The undulated-wall honeycomb structure 18 also has excellent heat-resistant shock properties, and accordingly is suitable for cases of mounting near the engine at the upstream side of the exhaust.

Figure 19A:
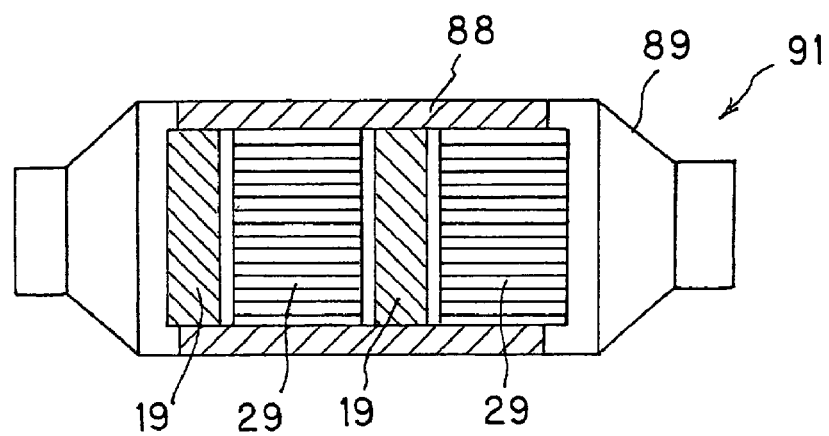
FIGS. 19 (a) and (b) are explanatory diagrams illustrating another example of a positional arrangement for using the undulated-wall honeycomb structure according to the present invention as an exhaust gas purification catalytic converter.
Figure 19B:
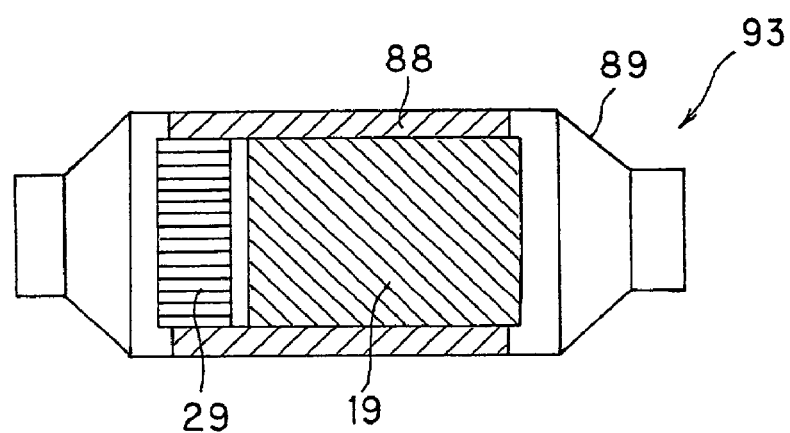

As shown in FIG. 19 (*a*), alternately arraying a plurality of undulated-wall honeycomb structures 19 and flat-wall honeycomb structures 29 in serial fashion enables an exhaust gas purification catalytic converter system 91 which has even higher catalytic cleaning capabilities to be obtained.

In addition, as shown in FIG. 19 (*b*), an exhaust gas purification catalytic converter system 93 may be configured using the undulated-wall honeycomb structure 19 downstream. This arrangement is suitable for cases wherein marked improvement of catalytic cleaning capabilities immediately following a cold start are desired over improvement of activation of the catalyst immediately following a cold start, or in the event that capturing and processing fine particle substances with the undulated-wall honeycomb structure 19 is desired.

Figure 20A:
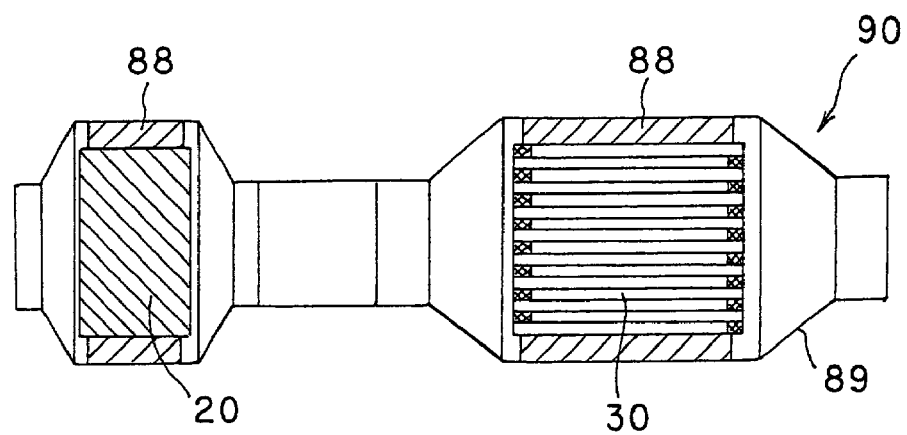
FIGS. 20 (a) and (b) are explanatory diagrams illustrating another yet example of a positional arrangement for using the undulated-wall honeycomb structure according to the present invention as an exhaust gas purification catalytic converter.
Figure 20B:
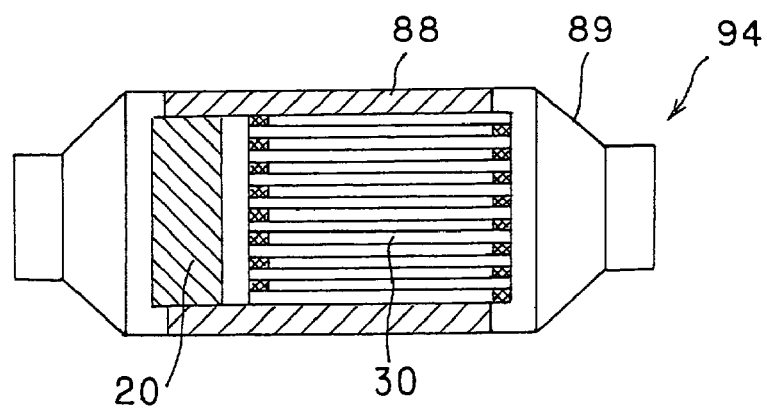

FIGS. 20 (*a*) and (*b*) are explanatory diagrams illustrating another yet example of a positional arrangement for using the undulated-wall honeycomb structure according to the present invention as an exhaust gas purification catalytic converter.

As shown in FIG. 20(*a*), an exhaust gas purification catalytic converter system 90 is also proposed wherein the undulated-wall honeycomb structure 20 serving as a catalyst carrier is disposed at the front or upstream side, and a fine particle removing filter 30 which is an undulated-wall honeycomb structure is disposed at the back or downstream side. The filter disposed at the back or downstream side may use a normal honeycomb structure, which is not an undulated-wall structure. Of course, an alternative exhaust gas purification catalytic converter system 94 includes a design may be employed wherein the honeycomb structures are not stored in separate metals cases 89 as shown in FIG. 20(*a*) but rather wherein the catalyst carrier and filter are stored in a single metal case 89 as shown in FIG. 20(*b*).

Also, in addition to begin suitably used as exhaust gas purification catalyst carriers for internal combustion engines of various types, particularly as exhaust gas purification catalyst carriers for vehicles, the undulated-wall honeycomb structure according to the present invention is also suitably used for exhaust gas purification systems wherein the honeycomb structure is electrically charged for electric adsorption of fine particles, systems for purification exhaust gas with non-thermal equilibrium plasma (non-thermal plasma) or microwave discharge plasma, as deodorizing catalyst carriers of various types, and even as chemical reactor carriers such as a modifying catalyst carrier for fuel cells or the like.

Figure 21:
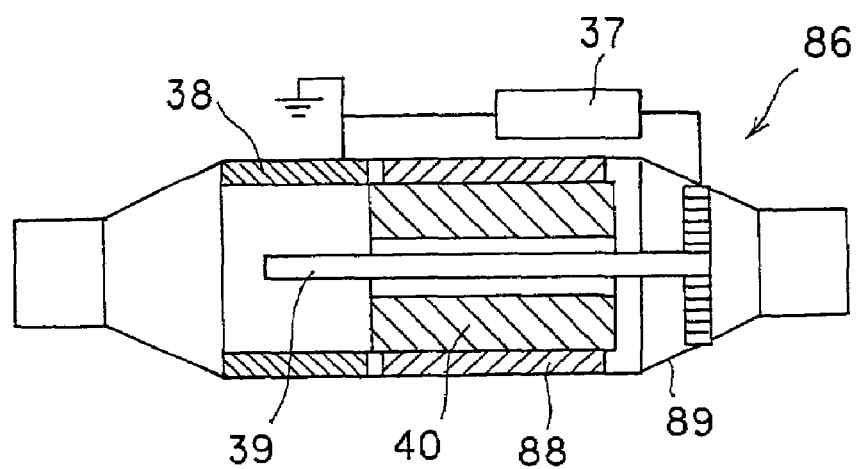
FIG. 21 is an explanatory diagram illustrating an example of a positional arrangement for using the undulated-wall honeycomb structure according to the present invention as an exhaust gas purification catalytic converter employing the effects of electric Coulomb force from discharge.

FIG. 21 shows an exhaust gas purification system 86 which employs the electrostatic dust collection method using high-voltage corona discharge which is used for purification exhaust gas from fixed sources, such as for removing floating fine particles or dioxin. With this system, using the undulated-wall honeycomb structure 40 enables increased fine particle substances capturing properties at the walls by Coulomb force and the synergistic effects of the undulated walls. With this example, a doughnut-shaped undulated-wall honeycomb structure 40, which has been hollowed out, is used, and a needle-shaped discharging negative electrode 39 is inserted therein. In addition, an arrangement may be made wherein a fine discharging electrode is inserted into the cells of the undulated-wall honeycomb structure 40. Forming the honeycomb structure of metal allows the honeycomb structure itself to serves as a ground electrode 38.

Figure 22:
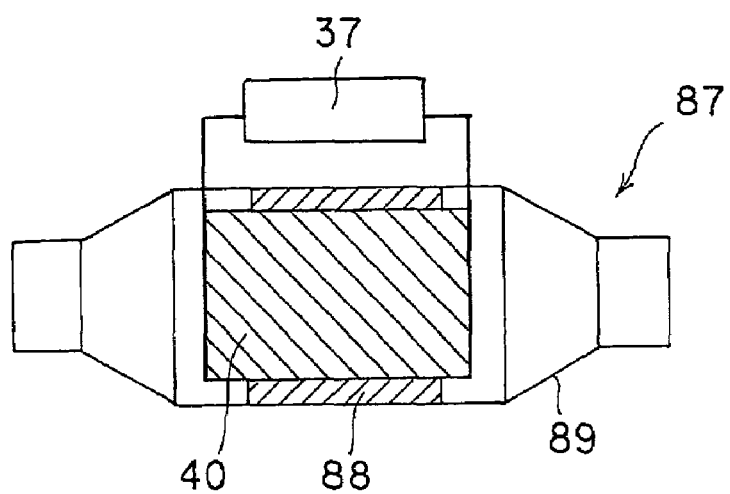
FIG. 22 is an explanatory diagram illustrating an example of a positional arrangement for using the undulated-wall honeycomb structure according to the present invention as an exhaust gas purification catalytic converter employing the effects of plasma.

Also, as shown in FIG. 22, an exhaust gas purification system 87 enables exhaust gas purification effects to be further increased, wherein a load of high voltage is applied in pulses from a high-voltage source 37 to the undulated-wall honeycomb structure 40 to cause electrolytic dissociation within the exhaust gas passages and forms plasma, this system using non-thermal equilibrium plasma which causes oxidizing reactions by radicals generated in the exhaust gas, or plasmas such as microwave discharge. In addition, causing the undulated-wall honeycomb structure 40 to carry catalyst is even more effective, due to the aiding effects of the catalyst. Accelerating radical reactions using tourmaline components is also effective.

The undulated-wall honeycomb structure an also be used for fuel cell system components. Examples of fuel cell systems include dispersion generation systems which may be combined with automotive use or relatively small co-generator systems, Polymer Electrolyte Fuel Cell (PEFC) systems used as portable power sources, and so forth.

Figure 23:
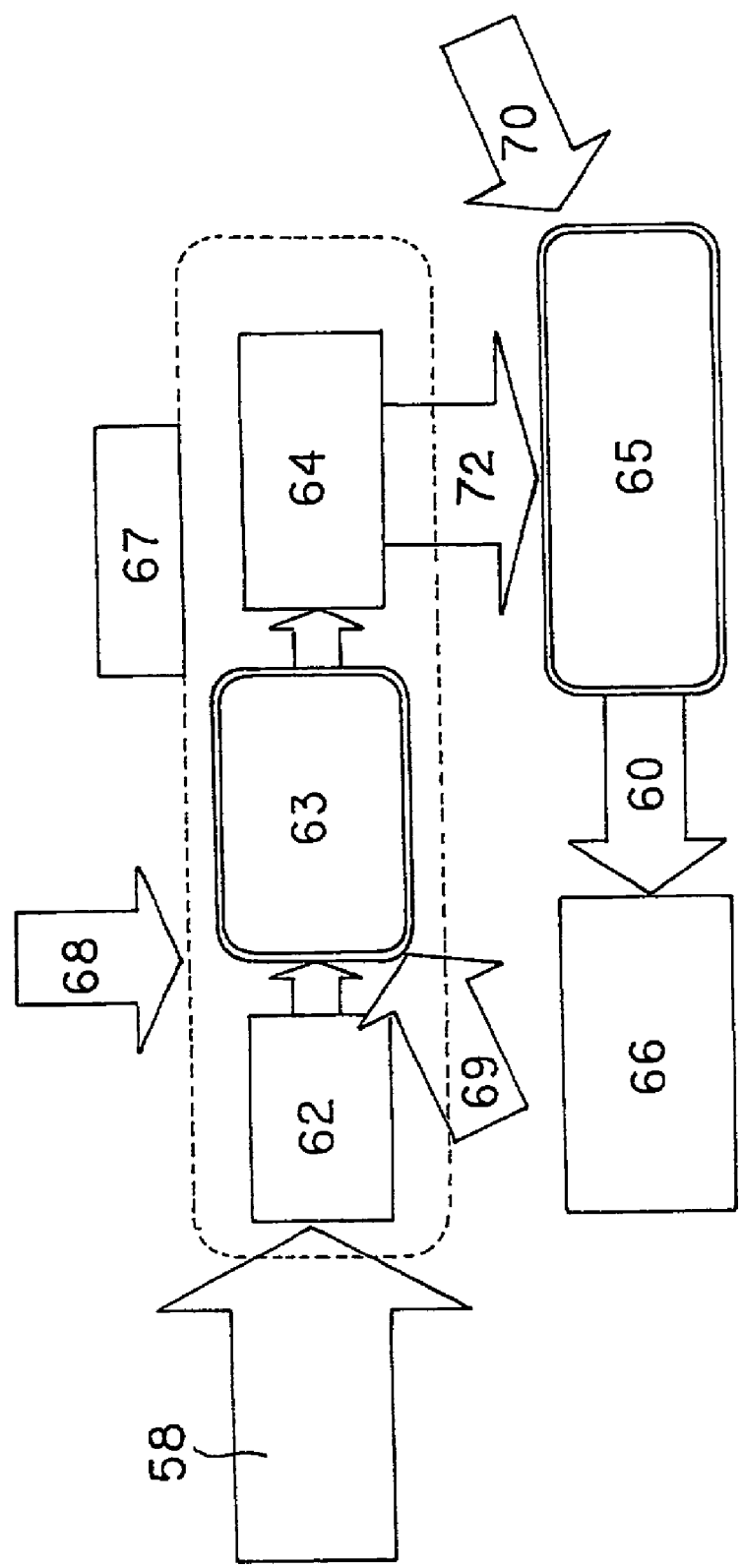
FIG. 23 is an explanatory diagram illustrating an example of a positional arrangement for using the undulated-wall honeycomb structure according to the present invention as a fuel cell system component.

FIG. 23 is an example of a polymer fuel cell system. With a fuel cell system, extracting hydrogen 72 at an early stage from fuel 58 such as methanol, natural gas, modified gasoline, etc. that has been transported to the modifier 67 of the fuel cell, sending the hydrogen 72 to the fuel cell stack 65, and effectively reacting the hydrogen 72 with oxygen at the fuel cell stack 65 to extract electricity, is necessary for the effectiveness of the modifier 63, and for improving the overall operating efficiency of the entire fuel cell system. The polymer fuel cell system also includes $CO_2$ remover 64, electric motor 66, heat 68, and air 70. Raising the temperature of the catalyst within the modifier 63 at an early point is important, this being the same operation as that of the exhaust gas purification catalyst, and using the undulated-wall honeycomb structure is effective for raising the efficiency of the modifier 63 and also enables the modifier 63 to be reduced in size. Conventionally, pellet catalyst was used for the modifier 63, but using the honeycomb structure allows modifying catalyst to be configured with low pressure loss, high surface area, and low thermal capacity, leading to further effectiveness by use of the undulated-wall honeycomb structure. Also, the fuel cell stack 65 generally uses a structure wherein carbon separators and solid polymer electrolytic film are laminated, to which a honeycomb structure can be applied, and using the undulated-wall honeycomb structure enables increasing efficiency and hence reduction in size. Fuel cell stack 65 generates direct current 60 to run electric motor 66. Use as a hydrogen-separating filter can also be conceived. With the present example, the structure of the modifier 63 is such that fuel 58 which has passed through a de-sulfurizing device 62 and water vapor pass through the catalyst using the undulated-wall honeycomb structure. This is also true for mid-scale dispersion generation and Solid Oxide Fuel Cells (SOFC) used for large-scale generation.

Figure 26:
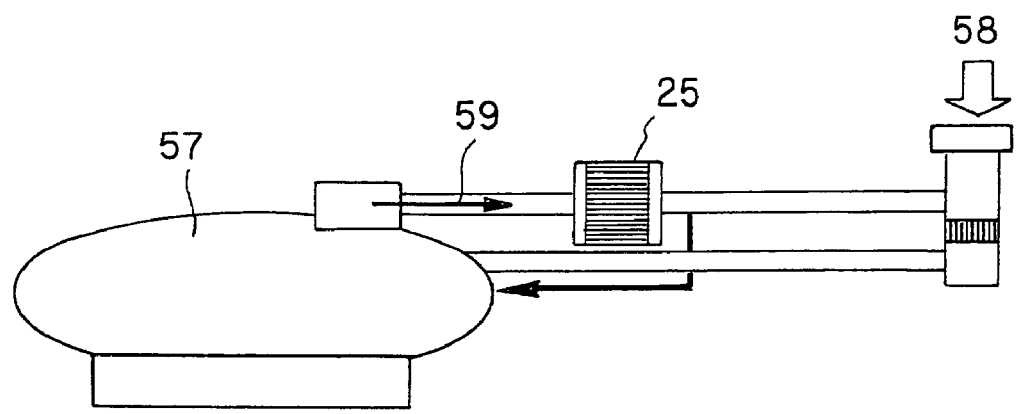
FIG. 26 is an explanatory diagram illustrating an example of a positional arrangement for using the undulated-wall honeycomb structure according to the present invention in a fuel tank evaporation system.

Recent stricter exhaust gas restrictions require suppressing not only components emitted while the vehicle is operating, but also suppressing leakage of volatile components of fuel leaking from the fuel tanks of vehicles and from the fuel tanks at fuel supplying facilities. FIG. 26 shows an example of applying the undulated-wall honeycomb structure to a fuel tank evaporation system. Generally, adsorbents such as activated charcoal are used in canisters for suppressing leakage of volatile components 59 of fuel 58 from the fuel tanks 57 of vehicles, and the undulated-wall honeycomb structure 25 or a filter comprising the undulated-wall honeycomb structure 25 can be used for such evaporation systems for effectively suppressing leakage of volatile components 59 of fuel 58.

Figure 27:
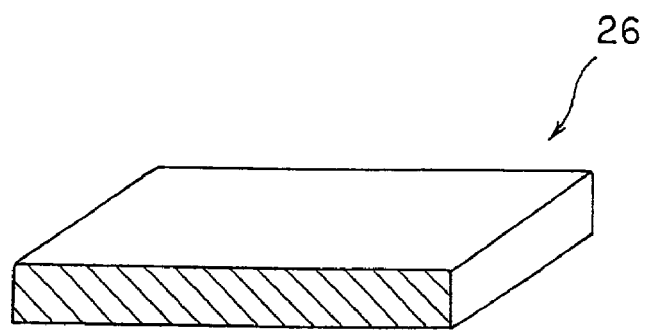
FIG. 27 is an explanatory diagram illustrating an example of a positional arrangement for using the undulated-wall honeycomb structure according to the present invention as a sandwich panel.

Honeycomb structures have also been put into practical use as a lightweight structural member as a sandwich panel also having cushioning properties, used with cardboard and building materials, and such structures formed of aluminum alloys are used for aircraft wings, but forming an undulated-wall honeycomb structure 26 of sandwich panels such as shown in FIG. 27 allows the cushioning properties to be increased.

EMBODIMENTS

Next, the properties of the undulated-wall honeycomb structure according to the present invention will be described with comparison to a conventional honeycomb structure.

For the materials, water and binder is added to cordierite of which the main ingredients are talc, kaolin, and alumina, the mixture is kneaded, an undulated-wall honeycomb structure 1 (first embodiment) with all walls formed with undulated shapes as shown in FIGS. 1 (*a*) and (*b*) and an undulated-wall honeycomb structure 31 (second embodiment) wherein undulated walls and flat walls are mixed as shown in FIG. 3 are formed using the recessed back plate wherein the thickness changes and the back plate wherein the diameters of the through holes differ, and the articles were cut to predetermined lengths and baked following drying, thus obtaining the present invention.

Also, for the sake of comparison, a normal honeycomb structure (first comparative example) wherein there are no undulated deformations on the walls and the cross-sectional form of the cell passages is square, using the same material as the first and second embodiments. The first and second embodiments and the comparative example thus fabricated had wall thickness of 0.09 mm, cell density of 400 cpsi ($62/cm^2$), external diameter of the honeycomb structure of 100 mm, length of the honeycomb structure 150 mm, thickness of the outer wall of 0.25 mm, amount of deformation of the undulated walls of 0.2 mm in amplitude (approximately twice of the wall thickness), and undulation pitch in the cell passage direction (one wavelength) of approximately 1.3 mm. Also, the porosity of the material was approximately 35%, and the average thermal expansions coefficient in the cell passage direction at 40 to 800° C. was $0.4 \times 10^{-6}/°C$.

Further, as a second comparative example, a normal honeycomb structure with no deformations on the walls was manufactured with the number of cells increased to more than twice, i.e., a cell density of 900 cpsi ($140/cm^2$), with the same wall thickness.

(Purification Capabilities Test)

A wash coat of γ-alumina component was applied to the obtained honeycomb structures, upon which precious metal components of platinum, rhodium, and palladium were carried on the coated layer so as to fabricate a catalyst member, and this catalyst member was hold within a metal container using a ceramic fiber mat, thus fabricating a catalytic converter. The amount of catalyst (precious metal component) held therein was set so as to be the same per unit capacity of honeycomb structure, and since the honeycomb structures were all the same size, the amount carried was also the same.

The fabricated catalytic converter was mounted underneath the floorboard (at a position 1100 mm from the engine) of a 1998 model vehicle having a 4-cylinder 2.3 liter gasoline engine, and purification capability testing according to the exhaust gas restriction mode FTP-75 which is representative of such in the USA. Note that the catalytic converter has been subjected to 50 hours of aging at 850° C. with another engine before this mode test.

Figure 7:
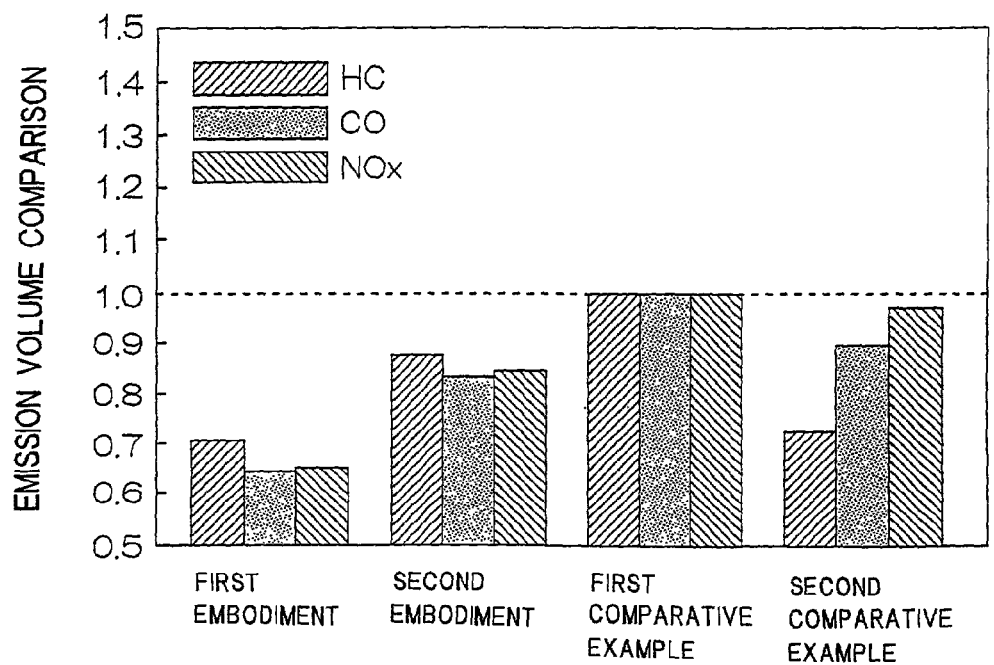
FIG. 7 is a graph illustrating the results of exhaust gas purification capabilities testing.

The test results are shown in FIG. 7. In FIG. 7, the emission of the comparative example 1 is used as a reference and the other samples are standardized. It was found that the emission of hydrocarbons (HC), carbon monoxide (CO), and oxides of nitrogen (NOx) of the first embodiment was markedly lessened as compared to the comparative example 1 which is a normal article with the same 400 cells. In addition, excellent purification capabilities were confirmed in comparison with the other second comparative example with 900 cpsi, as well.

Now, as described above, though using the undulated-wall honeycomb structure with undulated walls (first embodiment) yields excellent purification capabilities as compared to the normal article with the same cell density (first comparative example) or the article with high cell density (second comparative example), but the pressure loss is higher than that of the article with high cell density, so there are disadvantages regarding engine power output and fuel mileage. Accordingly, the pressure loss can be made to be around the same level as that of the high cell density article by partially forming undulated walls as with the undulated-wall honeycomb structure according to the second embodiment, rather than forming all walls undulated.

Testing the purification capabilities for a converter using the undulated-wall honeycomb structure according to the second embodiment yielded the results shown in FIG. 7, wherein the emissions such as HC increased as compared to the first embodiment, bit the purification capabilities are better than those of the first comparative example, and particularly the purification capabilities of CO and NOx in particular are better than the second comparative example as well.

(Isostatic Strength Test)

The isostatic strength test is a test performed by placing the honeycomb structure within a rubber cylindrical container, closing an aluminum plate lid, and placing isotropic pressure thereupon underwater, thereby reproducing the compression load weight on the honeycomb structure being held by the outer periphery portion of the converter can. The isostatic strength is represented by the value of the pressure being applied at the instant that the honeycomb structure is destroyed, and is stipulated in Stipulation M505-87 of the automobile stipulations issued by the Society of Automotive Engineers of Japan, Inc (JASO stipulation). Usually, a canning structure which takes advantage of external periphery portion holding of the honeycomb structure is used for automobile exhaust gas purification catalytic converters, and of course, the higher the isostatic strength is, the better, from the perspective of canning.

Figure 8:
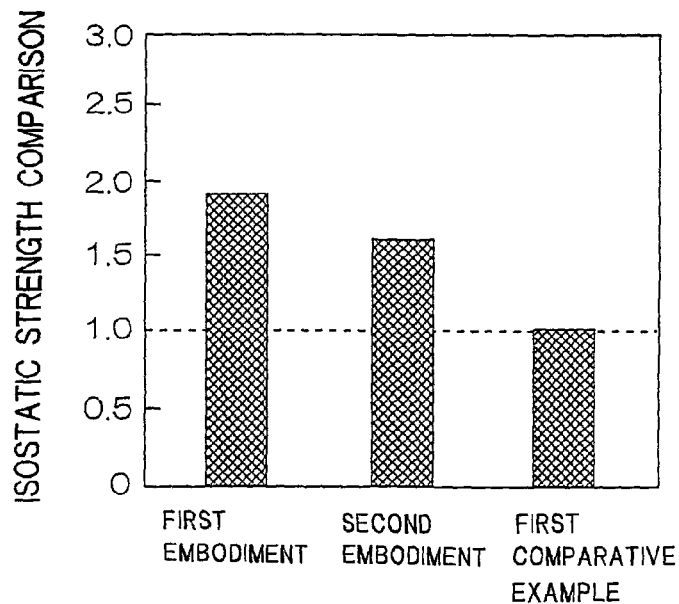
FIG. 8 is a graph illustrating the results of isostatic strength testing.

The results of performing the isostatic destructive strength test wherein compressing force from water pressure is placed upon all sides of the honeycomb structure using the first and second embodiments and the first comparative example is shown in FIG. 8, with the measurement values of the comparative example 1 used as a reference and the other samples standardized. The undulated-wall honeycomb structure according to the first embodiment exhibited higher isostatic destructive strength than the honeycomb structure article according to the first comparative example. It is thought that with normal honeycomb structures such as the first comparative example, in the event that deformations of walls and deformation of cell lattices due to manufacturing conditions exist in the honeycomb structure, destruction occurs at relatively low strengths with the deformed portion as the description point. On the other hand, it is though that with the first embodiment wherein the walls are formed undulated, absorption of the compressing force by the undulated walls occurs throughout the entire honeycomb structure, and thus destructive strength is increased. Based on such factors, the second embodiment exhibited properties intermediate between the first embodiment and the first comparative example.

(Compressive Strength Test)

Figure 9:
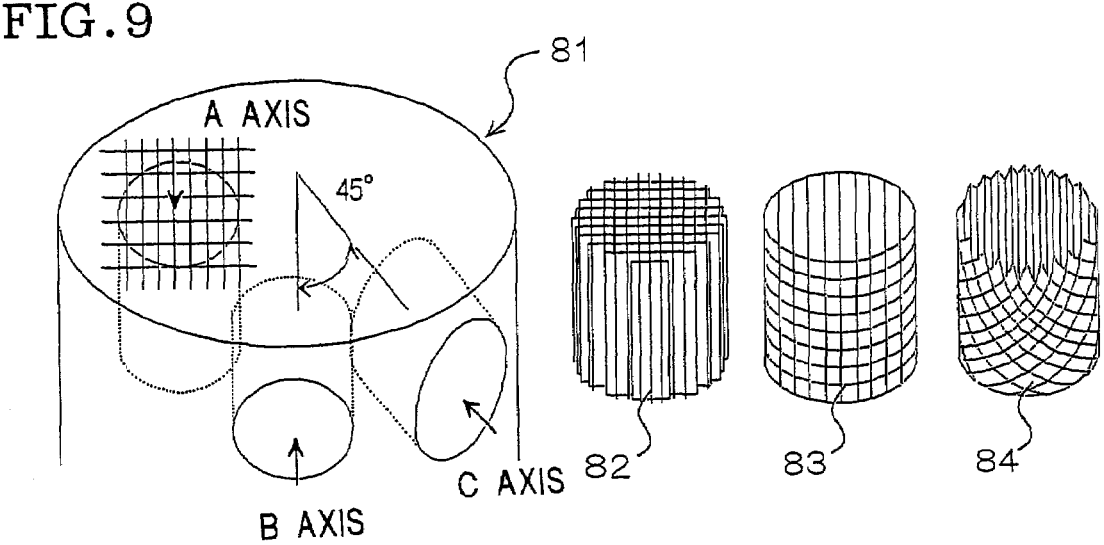
FIG. 9 is an explanatory diagram illustrating the method of extracting samples for providing for the compression strength test, and the shape of the samples.

JASO Stipulation M505-87 stipulates that compressive strength is to be measured in each of the A-axial, B-axial, and C-axial direction for a square cell. The method for extracting a measurement sample is shown in FIG. 9. For the A-axial destructive strength, a cylindrical sample (A-axis sample 82) 25.4 mm in diameter and 25.4 mm in length is extracted from the honeycomb structure 81 so that the longitudinal direction of the cylindrical form is in the cell passage direction (the A axis), and the strength is the value obtained by dividing the destructive load compressing the A-axial sample in the cell passage direction by the area of the compression plane. In the same way, for the B-axial destructive strength, a sample (B-axis sample 83) is taken in the B-axial direction perpendicular to the A axis following the walls and measured, and also, for the C-axial destructive strength, a same (C-axis sample 84) is taken in the C-axial direction perpendicular to the A axis and rotated 45° on the cell passage cross-section from the B-axial direction, and measured.

Figure 10:
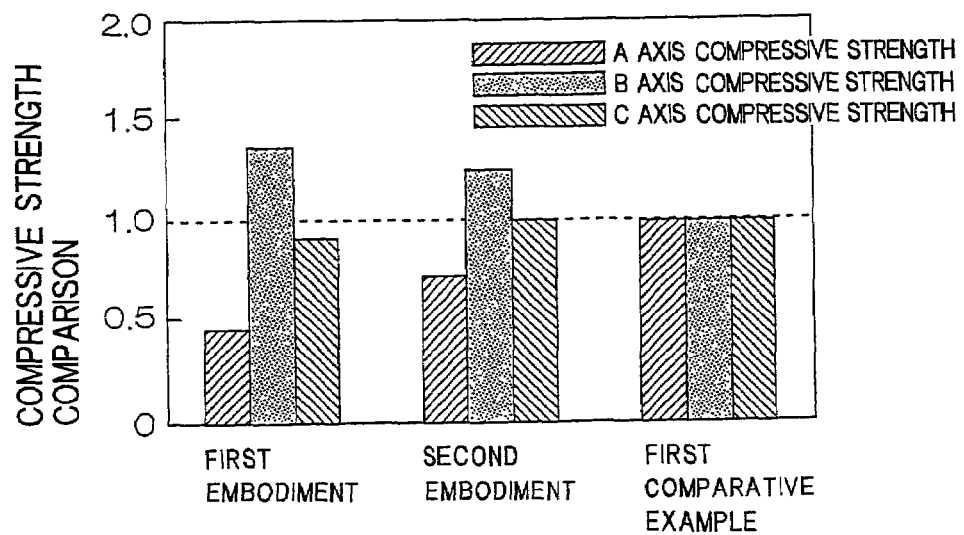
FIG. 10 is a graph illustrating the results of compressive strength testing.

The results of the compressive strength test are shown in FIG. 10, with the comparative example 1 used as a reference and the other samples standardized. As can be seen from the results of the first and second embodiments, the compressive strength with undulated walls decreases in the A-axial direction, but tends to increase in the B-axial direction. Accordingly, it can be thought that this increase in compressing strength in the B-axial direction is lending to the improvement of the isostatic strength.

Incidentally, the reason that with the first and second embodiments the A-axial compressive strength does not increase as with the B-axial compressive strength even though undulations are formed in the A-axial direction which is the cell passage direction is though to be compressing force cannot be absorbed at the intersecting portions in the A-axial direction since the intersecting portions of the walls are not deformed in an undulating manner in the A-axial direction.

Now, a similar phenomenon was observed regarding the bending strength, as well. However, with the honeycomb structure canning holding method for catalytic converters which is common nowadays, holding the honeycomb structure by the side surface with a ceramic fiber mat or wire mesh mat is most common, so deterioration in strength in the A-axial direction will not be a major problem in canning.

(Thermal Shock Resistance Testing)

JASO Stipulation M505-87 stipulates the method for testing thermal shock resistance. First, a honeycomb structure at room temperature is placed into an electric furnace maintained at room temperature and a predetermined humidity, held for 20 minutes, and subsequently taken out onto fireproof bricks. If observing the exterior and lightly tapping the periphery portion of the honeycomb structure with a metal bar does not result in cracks being observed, and the striking sound is a metallic sound and is not dull, the article passes. Next, the same testing is repeatedly performed with the oven temperature 50° C. higher each time, until the article fails. Thus, in the event that an article fails at room temperature +950° C. for example, this means that the thermal shock resistance have a 900° C. difference. Note that the exhaust gas temperature tends to rise each year, and the catalyst members are being placed at positions closer to the engine, so the thermal shock resistance required of the honeycomb structure are even stricter.

Figure 11:
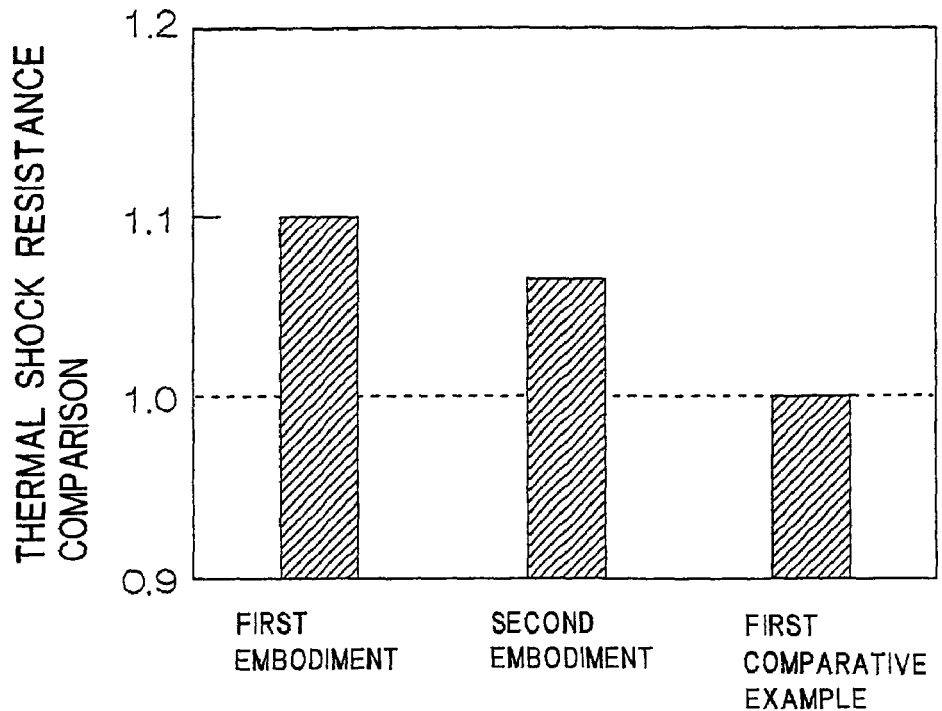
FIG. 11 is a graph illustrating the results of thermal shock resistance.

The results of the thermal shock resistance test are shown in FIG. 11, with the measurement values of the comparative example 1 used as a reference and the results of the other samples standardized. The first embodiment was found to have improved thermal shock resistance as compared to the first comparative example. In addition, the second embodiment exhibited intermediate thermal shock resistance between those of the first embodiment and the first comparative example. Thus, it can be thought that forming the walls with undulated shapes facilitates absorption of thermal stress warping through the entirety, thereby improving thermal shock resistance.

(Water Absorption Percentage Measurement)

The water absorption percentage test is performed by first measure the dry mass ($M_1$) of the honeycomb structure which is the sample to be measured, next the sample is placed in water with the cell direction vertical, the sample is taken out of the water following one minute in the water and excess water is shaken off lightly. Next, the sample is placed in water again with the cell direction vertical, and the sample is taken out of the water following one minute. The sample is placed on a conveyer with the cell direction vertical, passed underneath an air nozzle which moves reciprocally in directions at right angles to the direction of progression of the conveyer, and the water-absorption mass ($M_2$) is measured after excessive water has been blown off by the air. The percentage of water absorption $W_{ab}$ is calculated by $W_{ab}=(M_2-M_1)/M_1\times 100$ (wt %).

Figure 12:
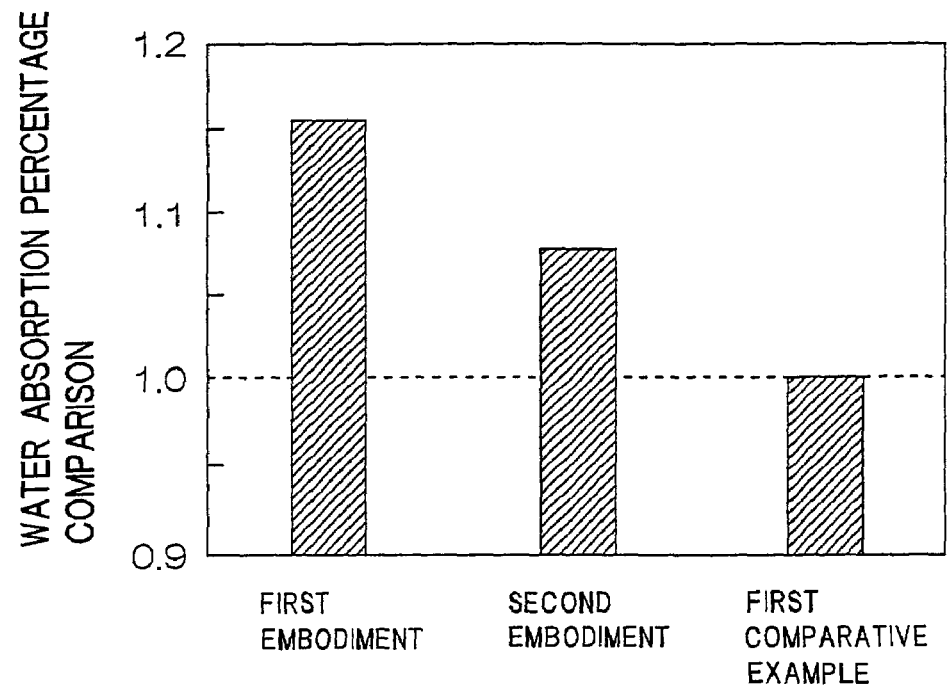
FIG. 12 is a graph illustrating the results of water absorption testing.

The results of the water absorption properties of the samples measured by such a testing method is shown in FIG. 12, with the comparative example 1 used as a reference. As can be clearly understood from FIG. 12, with the same cell density, the water absorption percentage increases with increased portions formed with undulated shapes in the walls, i.e., with increased wall surface area.

With regard to the wash coat of γ-alumina on the honeycomb structure, the higher the water absorption percentage is the better, and the amount of wash coat of γ-alumina tends to increase since the amount of catalyst being carried has been tending to increase recently for improved catalyst purification capabilities. At this time, higher water absorption is more advantageous since the amount coated per coat increases. Accordingly, the undulated-wall honeycomb structure according to the present invention has excellent wash coat holding capabilities, and thus can be said to be more advantageous than normal honeycomb structures from the perspective of carrying catalyst.

The above has been a description of the undulated-wall honeycomb structure according to the present invention and the manufacturing method thereof, mainly with reference to an arrangement with a square cell cross-sectional shape which has good mechanical properties and is easy to manufacture, but it is needless to say that the present invention can be applied to honeycomb structures having other cell cross-sectional shapes, as well. That is, all or part of the walls in honeycomb structures with triangular or hexagon-shaped cell cross-sections may be formed with undulated shapes.

INDUSTRIAL APPLICABILITY

As described above, with the undulated-wall honeycomb structure according to the present invention and the manufacturing method thereof, various advantages can be obtained such as improved exhaust gas purification capabilities and catalyst capabilities, improved mechanical strength for canning, and further improved thermal shock resistance, meaning that the present invention has outstanding advantages enabling installing closer to combustion engines such as engines with higher exhaust gas pressure and higher exhaust gas temperature. In addition, the wash coat properties improve, which is advantageous with regard to the manufacturing process of the catalyst member. The undulated-wall honeycomb structure according to the present invention is suitably used as a internal combustion engine exhaust gas purification catalyst carrier or deodorizing catalyst carrier for vehicle exhaust gas and the like, as a filter for various types of filtering devices, as a heat exchanger unit, or as a chemical reactor carrier such as a modifying catalyst carrier for fuel cells or the like.

The invention claimed is:

1. An undulated-wall honeycomb structure having a plurality of cell passages defining a cell passage direction, which are mutually parallel in the cell passage direction;
    wherein
    (1) intersection portions between walls defining said cell passages have a predetermined pitch in cross-sections perpendicular to said cell passages and are located in a pattern,
    (2) each of said cell passages has an adjacent pair of undulating wall face portions of said walls excluding said intersection portions, each undulating wall face portion having an undulated shape including recessions and protrusions in both the cell passage direction and a cross-sectional direction perpendicular to said cell passage direction, and (3) for each cell passage, the undulating wall face portions of the adjacent pair are positioned such that (i) corresponding protrusions of each of the adjacent undulating wall face portions face one another and corresponding recessions of each of the adjacent undulating wall face portions face one another or (ii) corresponding protrusions of one of the adjacent undulating wall face portions face recessions of the other, (4) an adjacent pair of flat wall face portions is located opposite the adjacent pair of undulating wall face portions, and (5) said undulated-wall honeycomb structure comprises at least 56 of said cell passages.

2. An undulated-wall honeycomb structure according to claim 1, wherein for each cell passage, at least one of said plurality of walls forming said cell passage has an undulated shape.

3. An undulated-wall honeycomb structure according to claim 1, wherein said undulated-wall honeycomb structure has a center portion surrounded by an outer portion when viewed in cross-section defined substantially perpendicular to said cell passage direction, and each wall face portion of a cell passage having an undulated shape comprises a wall face portion having an undulated deformation that is greater at said outer portion of the honeycomb structure than at said center portion of the honeycomb structure.

4. An undulated-wall honeycomb structure according to claim 1, wherein the amplitude of the undulated walls having an undulated shape is at least 150% of the thickness of said walls.

5. An undulated-wall honeycomb structure according to claim 1, wherein a line connecting the highest portions of the protrusions and/or the lowest portions of the recessions of the wall face portions having an undulated shape in said cell passage direction repeats a pattern of turning in the direction substantially perpendicular to said cell passage direction on said wall face portions.

6. An undulated-wall honeycomb structure according to claim 1, wherein cell passages formed by said wall face portions of said walls having an undulated shape and cell passages defined by said wall face portions of said walls having a flat shape coexist in a discontinuous manner.

7. An undulated-wall honeycomb structure according to claim 1, wherein:
said undulated-wall honeycomb structure has a center portion surrounded by an outer portion when viewed in cross-section defined substantially perpendicular to said cell passage direction,
said center portion comprises cell passages defined by said wall face portions of said walls having an undulated shape,
said outer portion comprises cell passages defined by said wall face portions of said walls having a flat shape,
the thickness of the walls of the cell passages within said outer portion is greater than the thickness of the walls of the cell passages within said center portion, and
the thickness of the walls increases in stages from the center portion toward the outer portion or only increases in stages near a boundary between the center portion and the outer portion.

8. An undulated-wall honeycomb structure according to claim 1, wherein the honeycomb structure is made from a material selected from the group consisting of cordierite, alumina, mullite, lithium aluminum silicate, aluminum titanate, titania, zirconia, silicone nitride, aluminum nitride, and silicon carbide; or selected from the group consisting of stainless steel, and aluminum alloy; or selected from the group consisting of an adsorbent activated charcoal, silica gel, and zeolite.

9. An undulated-wall honeycomb structure according to claim 8, wherein the porosity of the material is between 45% to 80%.

10. A fine particle removing filter comprising the undulated-wall honeycomb structure according to claim 9, comprising filtering layers of walls partitioning the cell passages, wherein one end of particular cell passages of said undulated-wall honeycomb structure and the other end of the remaining cell passages are plugged.

11. A fine particle removing filter according to claim 10 wherein the surface roughness of the undulated walls of said undulated-wall honeycomb structure is 10% or more in Valley Level.

12. A fine particle removing filter according to claim 10 wherein the wall thickness of said undulated-wall honeycomb structure is about 0.2 to 1.2 mm.

13. A fine particle removing filter according to claim 10 wherein the cell density of said undulated-wall honeycomb structure is about 50 to 600 cpsi (cells per square centimeter).

14. An undulated-wall honeycomb structure according to claim 1, further comprising a housing containing said honeycomb structure, and a catalyst located on the surface of the cell wall face and/or in micropores within the walls of said honeycomb structure.

15. An undulated-wall honeycomb structure according to claim 14, wherein the wall thickness is about 0.01 to 0.12 mm.

16. An undulated-wall honeycomb structure according to claim 14, wherein the cell density is about 200 to 3000 cpsi (cells per square inch).

17. An exhaust gas purification catalytic converter, comprising the undulated-wall honeycomb structure according to claim 14.

18. An exhaust gas purification catalytic converter according to claim 17, wherein the catalyst component is selected from the group consisting of a three way catalyst, an oxide catalyst, an NOx reducing catalyst, a sulfide catalyst, a volatile organic gas VOC (Gaseous Organic Compounds), and a dioxins decomposing-removing catalyst.

19. An exhaust gas purification catalytic converter system comprising a plurality of the exhaust gas purification catalytic converters according to claim 17, and a plurality of catalytic converters wherein catalyst is carried on a normal flat-wall honeycomb structure, said catalytic converters being serially alternately arrayed.

20. An exhaust gas purification catalytic converter system, comprising an exhaust gas purification catalytic converter comprising an undulated-wall honeycomb structure having a gas flow direction and a plurality of cell passages which are mutually parallel in the gas flow direction, wherein:
intersection portions between walls partitioning said cell passages are located at a predetermined pitch at cross-sections perpendicular to said cell passages and are located in a pattern,
the wall face portions of said walls excluding said intersection portions have an undulated shape in both the gas flow direction and a cross-sectional direction perpendicular to said gas flow direction, and
said catalytic converter is located on the upstream side of an exhaust gas source, and the fine particle removing filter according to claim 10 is on the downstream side of said exhaust gas source.

21. An exhaust gas purification catalytic converter system according to claim 20, wherein each of said fine particle removing filters is a readily-exchangeable cartridge configuration.

22. An exhaust gas purification system comprising the undulated-wall honeycomb structure according to claim 14, for capturing fine particle substances in an exhaust gas, said exhaust gas purification system comprising:
  means for charging said undulated-wall honeycomb structure for electrically capturing fine particle substances.

23. An exhaust gas purification system comprising the undulated-wall honeycomb structure according to claim 14, for capturing fine particle substances in an exhaust gas, said exhaust gas purification system comprising non-thermal equilibrium plasma (non-thermal plasma) or microwave discharge plasma.

24. A fuel tank evaporation system comprising the undulated-wall honeycomb structure according to claim 14, for suppressing external leakage of volatile components of fuel.

25. An exhaust gas purification system according to claim 22, wherein said undulated-wall honeycomb structure is a readily exchangeable cartridge configuration.

26. A fuel cell system component comprising the undulated-wall honeycomb structure according to claim 14.

27. A sandwich panel comprising the undulated-wall honeycomb structure according to claim 14.

28. An exhaust gas purification system according to claim 23, wherein said undulated-wall honeycomb structure is a readily exchangeable cartridge configuration.

\* \* \* \* \*